(12) United States Patent
Wang et al.

(10) Patent No.: US 9,811,165 B2
(45) Date of Patent: Nov. 7, 2017

(54) ELECTRONIC SYSTEM WITH GESTURE PROCESSING MECHANISM AND METHOD OF OPERATION THEREOF

(71) Applicant: Samsung Electronics Co., Ltd., Suwon-si, Gyeonggi-Do (KR)

(72) Inventors: Rongrong Wang, San Jose, CA (US); Anton Treskunov, Santa Clara, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 27 days.

(21) Appl. No.: 14/644,956

(22) Filed: Mar. 11, 2015

(65) Prior Publication Data

US 2016/0266649 A1 Sep. 15, 2016

(51) Int. Cl.
*G06F 3/01* (2006.01)
*G06F 3/03* (2006.01)

(52) U.S. Cl.
CPC .............. *G06F 3/017* (2013.01); *G06F 3/011* (2013.01); *G06F 3/0304* (2013.01); *G06F 3/0325* (2013.01)

(58) Field of Classification Search
CPC ........................ G06F 3/01; G06F 3/017; G06F 3/0304–3/0325; G06F 3/033; G06F 3/0346; G06F 3/048–3/04897; G06F 2203/04801; G06F 3/0334; G06K 9/00335–9/00355
See application file for complete search history.

(56) References Cited

U.S. PATENT DOCUMENTS

| 7,662,113 | B2 | 2/2010 | Pearl et al. | |
|---|---|---|---|---|
| 8,452,051 | B1 | 5/2013 | Lee | |
| 2004/0164851 | A1* | 8/2004 | Crawshaw | G06K 9/00798 340/435 |
| 2011/0119640 | A1 | 5/2011 | Berkes et al. | |
| 2012/0062558 | A1* | 3/2012 | Lee | G06F 3/017 345/419 |
| 2012/0133616 | A1* | 5/2012 | Nishihara | G06F 3/0325 345/175 |

(Continued)

FOREIGN PATENT DOCUMENTS

CN 101840281 A * 12/2012

OTHER PUBLICATIONS

School of Communication and Information Engineering, Shanghai University, "Human-computer Interaction using Pointing Gesture based on an Adaptive Virtual Touch Screen", 2013.

(Continued)

*Primary Examiner* — Nathan Danielsen
(74) *Attorney, Agent, or Firm* — IP Investment Law Group

(57) ABSTRACT

An electronic system includes a control unit, configured to identify a first sensor reading for capturing a gesture directed at a display interface using a first range profile; identify a second sensor reading for capturing the gesture directed at the display interface using a second range profile; calculate a blended position indicator based on the first sensor reading, the second sensor reading, or a combination thereof; and a communication interface, coupled to the control unit, configured to communicate the blended position indicator by generating a cursor at the blended position indicator.

20 Claims, 6 Drawing Sheets

(56) References Cited

U.S. PATENT DOCUMENTS

| | | | | |
|---|---|---|---|---|
| 2014/0292647 A1* | 10/2014 | Murase | ............... | G06F 3/017 345/156 |
| 2015/0035750 A1* | 2/2015 | Bailey | ............... | G06F 3/0346 345/158 |
| 2015/0062010 A1* | 3/2015 | Lin | ............... | G06F 3/017 345/157 |

OTHER PUBLICATIONS

Aaborg University, Denmark, "Evaluation of Skeleton Trackers and Gesture Recognition for Human-robot Interaction", 2013.
Mitsubishi Electronic Research Laboratories, "Television Control by Hand Gestures", 1994.
University of Tokyo, University of Electro-Communications, Tokyo, "Real-Time Fingertip Tracking and Gesture Recognition", 2001.
University of Twente, The Netherlands, "Vision-Based Human Motion Analysis: An Overview", 2005.

\* cited by examiner

ELECTRONIC SYSTEM WITH GESTURE PROCESSING MECHANISM AND METHOD OF OPERATION THEREOF

TECHNICAL FIELD

An embodiment of the present invention relates generally to an electronic system, and more particularly to a system with a gesture processing mechanism.

BACKGROUND

Modern consumer and industrial electronics, especially display devices such as networked-enabled displays, touch-screen displays, curved displays, and tablet devices are providing increasing levels of functionality to support modern life including facilitating user interactions with electronic devices and appliances. Research and development in the existing technologies can take a myriad of different directions.

As users become more empowered with the growth of interactions between users and devices, new and old paradigms begin to take advantage of this new technology space. There are many technological solutions to take advantage of these new device capabilities. However, user interactions with such electronic devices and appliances are often imprecise or inaccurate as a result of deficiencies in devices or systems used to track and process user gestures associated with such interactions.

Thus, a need still remains for an electronic system with a gesture processing mechanism appropriate for interactions between users and today's devices. In view of the ever-increasing commercial competitive pressures, along with growing client expectations and the diminishing opportunities for meaningful product differentiation in the marketplace, it is increasingly critical that answers be found to these problems.

Additionally, the need to reduce costs, improve efficiencies and performance, and meet competitive pressures adds an even greater urgency to the critical necessity for finding answers to these problems. Solutions to these problems have been long sought but prior developments have not taught or suggested any solutions and, thus, solutions to these problems have long eluded those skilled in the art.

SUMMARY

An embodiment of the present invention provides an electronic system including a control unit, configured to identify a first sensor reading for capturing a gesture directed at a display interface using a first range profile; identify a second sensor reading for capturing the gesture directed at the display interface using a second range profile; calculate a blended position indicator based on the first sensor reading, the second sensor reading, or a combination thereof; and a communication interface, coupled to the control unit, configured to communicate the blended position indicator by generating a cursor at the blended position indicator.

An embodiment of the present invention provides a method of operation of an electronic system including identifying, with a control unit, a first sensor reading for capturing a gesture directed at a display interface using a first range profile; identifying a second sensor reading for capturing the gesture directed at the display interface using a second range profile; calculating a blended position indicator based on the first sensor reading, the second sensor reading, or a combination thereof; and communicating, with a communication interface coupled to the control unit, the blended position indicator by generating a cursor at the blended position indicator.

An embodiment of the present invention provides a non-transitory computer readable medium including identifying a first sensor reading for capturing a gesture directed at a display interface using a first range profile; identifying a second sensor reading for capturing the gesture directed at the display interface using a second range profile; calculating a blended position indicator based on the first sensor reading, the second sensor reading, or a combination thereof; and communicating the blended position indicator by generating a cursor at the blended position indicator.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
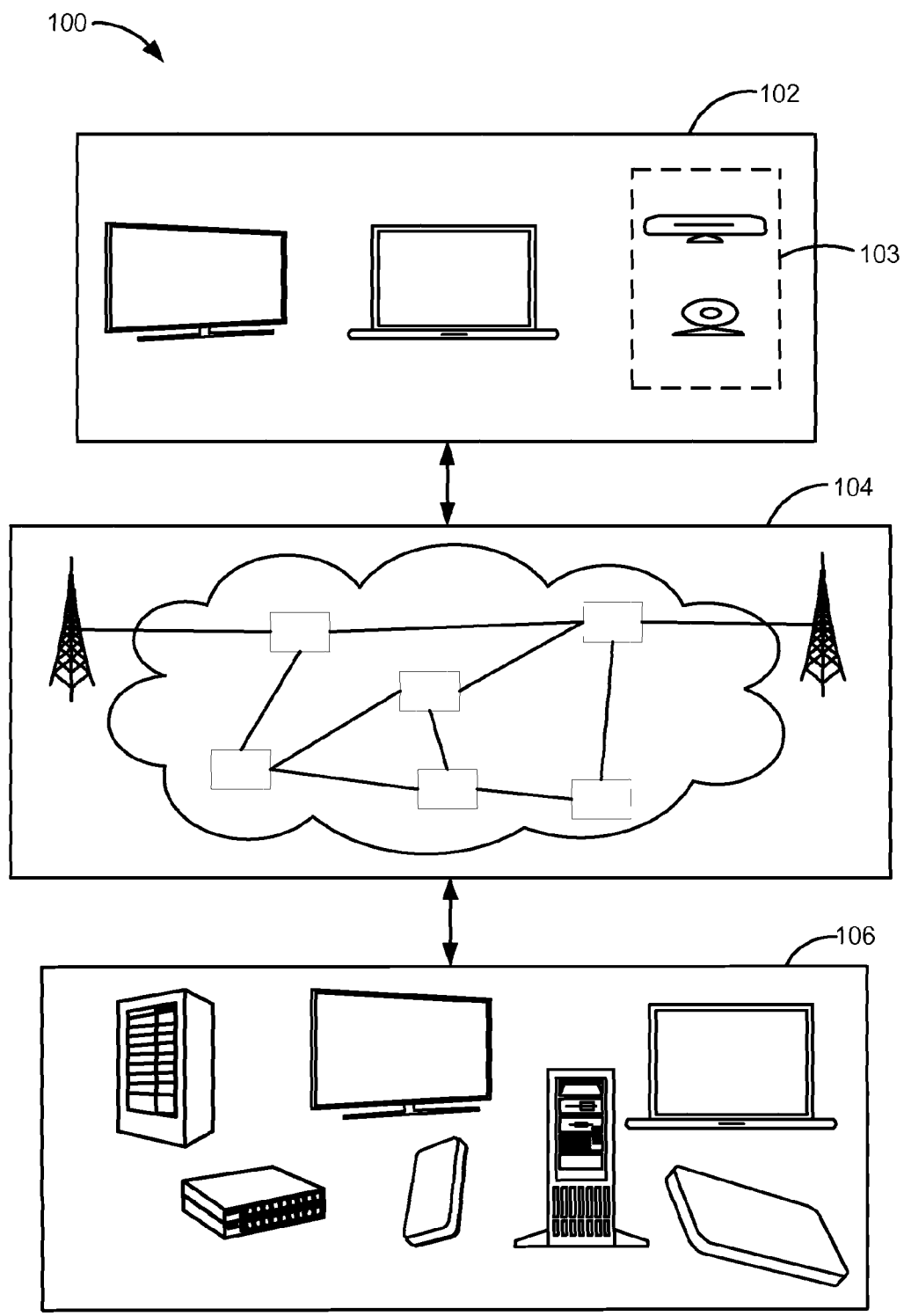
FIG. 1 is an electronic system with a gesture processing mechanism in an embodiment of the present invention.

Embodiments of the present invention provide a more accurate mechanism for controlling a display interface such as the first display interface, the second display interface, or a combination thereof. More specifically, the electronic system can use a blended position indicator to approximate the direction of a gesture made by a user. The electronic system can more accurately approximate the direction of the gesture based on readings from multiple sensors rather than relying on readings from only one of the sensors.

Embodiments of the present invention can also enhance the usability of different sensors provided by different sensor vendors or manufacturers. More specifically, the electronic system can blend or combine readings from a first sensor and readings from a second sensor with different capturing capabilities and different granularity limitations. For example, the electronic system can blend or combine readings from different sensors for ensuring a user gesture is captured by the second sensor when the user gesture is outside of a capture range of the first sensor.

Embodiments of the present invention can provide an improved mechanism for controlling a display interface when the user is gesturing in a rapid or unpredictable manner. The electronic system can calculate an inferred terminal point, representing an obscured or hard to detect appendage position, based on known appendage positions, a first appendage orientation, and a second appendage orientation. The electronic system can calculate the blended position indicator based on the inferred terminal point to prevent the cursor from skipping or disappearing when an appendage position of the user is not captured by any of the sensors.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation.

The term "module" referred to herein can include software, hardware, or a combination thereof in the embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown an electronic system 100 with a gesture processing mechanism in an embodiment of the present invention. The electronic system 100 includes a first device 102, such as the display device, connected to a second device 106, such as a server. The first device 102 can communicate with the second device 106 through a communication path 104, such as a wireless or wired network.

For illustrative purposes, the electronic system 100 is described with the first device 102 as the display device, although it is understood that the first device 102 can be different types of devices. For example, the first device 102 can be any of a variety of mobile devices, such as a smartphone, a cellular phone, a tablet device, a laptop computer, or a combination thereof. Also, for example, the first device 102 can be any of a variety of non-mobile devices, such as a gaming console, an entertainment device, a desktop computer, a server, or a combination thereof.

As yet another example, the first device 102 can include one or more sensors 103 or a component therein. The sensors 103 can capture images, video, or visual spectra and can determine spatial locations or distances. More specifically, the sensors 103 can capture static images, video frames, visual spectra, light reflectance, infrared (IR) signatures, ultraviolet (UV) signatures, or a combination thereof. For example, the sensor 103 can include a depth sensor, a two-dimensional camera, a three-dimensional camera, a stereoscopic camera, a motion sensor, a red-green-blue (RGB) sensor, an active pixel sensor, a charge-coupled sensor, a complementary metal-oxide-semiconductor (CMOS) sensor, or a combination thereof.

For illustrative purposes, the sensors 103 are described as being integrated in the first device 102. However, it is understood that the sensors 103 can be independent devices separate from the first device 102. In addition, the sensors 103 can be coupled to the first device 102, the second device 106, or a combination thereof. For example, the sensors 103 can include a Microsoft Kinect™ sensor, a Creative Senz3D™ sensor, or a Leap Motion™ sensor.

The first device 102 can couple to the communication path 104 to communicate with the second device 106. For illustrative purposes, the electronic system 100 is described with the second device 106 as a server, although it is understood that the second device 106 can be different types of devices. For example, the second device 106 can be any of a variety of mobile devices, such as a smartphone, a cellular phone, a tablet device, a laptop computer, or a combination thereof.

Also, the second device 106 can be any variety of devices for displaying data, information, graphics, or a combination thereof. For example, the second device 106 can be a display device such as a television, a projector device, or a monitor. The second device 106 can display an image captured by the sensors 103.

The second device 106 can also be any of a variety of centralized or decentralized computing devices. For example, the second device 106 can be a grid computing resource, a server farm, a virtualized computing resource, a cloud computing resource, a router, a switch, a peer-to-peer distributed computing resource, or a combination thereof.

The second device 106 can be centralized in a single computer room, distributed across different rooms, distributed across different geographical locations, or embedded within a telecommunications network. For example, the second device 106 can be a particularized machine, such as a mainframe, a server, a cluster server, a rack mounted server, or a blade server, or as more specific examples, an IBM System z10™ Business Class mainframe or a HP ProLiant ML™ server. The second device 106 can couple with the communication path 104 to communicate with the first device 102.

Also for illustrative purposes, the electronic system 100 is shown with the second device 106 and the first device 102 as end points of the communication path 104, although it is understood that the electronic system 100 can have a different partition between the first device 102, the second device 106, and the communication path 104. For example, the first device 102, the second device 106, or a combination thereof can also function as part of the communication path 104.

The communication path 104 can be a variety of networks or communication mediums. For example, the communication path 104 can include wireless communication, wired communication, optical communication, or a combination thereof. Satellite communication, cellular communication, Bluetooth™, Bluetooth™ Low Energy (BLE), wireless High-Definition Multimedia Interface (HDMI), ZigBee™, Near Field Communication (NFC), Infrared Data Association standard (IrDA), wireless fidelity (WiFi), and worldwide interoperability for microwave access (WiMAX) are examples of wireless communication that can be included in the communication path 104. Ethernet, HDMI, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include a direct connection, personal area network (PAN), local area network (LAN), metropolitan area network (MAN), wide area network (WAN) or any combination thereof.

Figure 2:
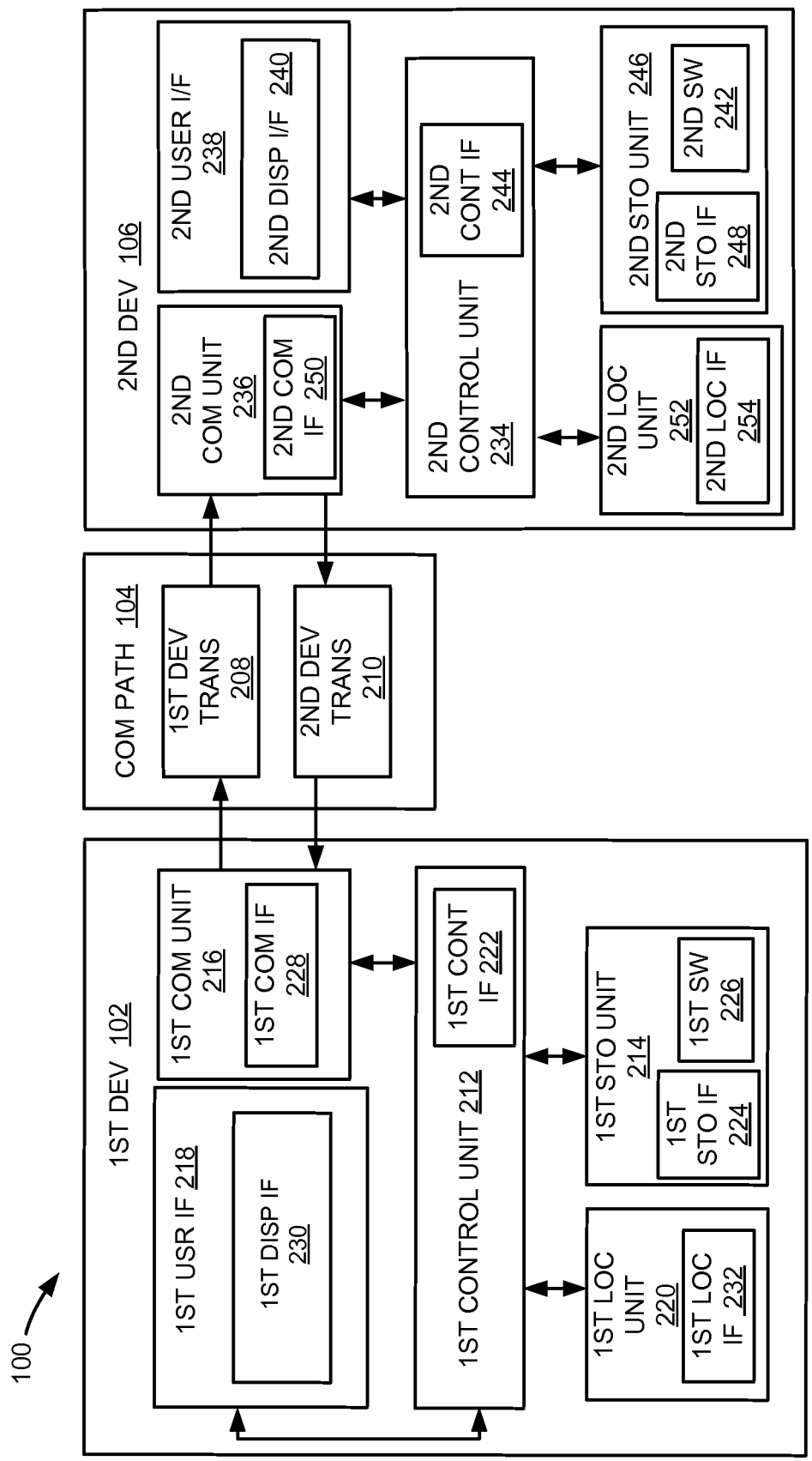
FIG. 2 is an example block diagram of the electronic system.

Referring now to FIG. 2, therein is shown an exemplary block diagram of the electronic system 100. The electronic system 100 can include the first device 102, the communication path 104, and the second device 106. The first device 102 can send information in a first device transmission 208 over the communication path 104 to the second device 106. The second device 106 can send information in a second device transmission 210 over the communication path 104 to the first device 102.

For brevity of description in this embodiment of the present invention, the first device 102 will be described as a display device and the second device 106 will be described as a server. Embodiments of the present invention are not limited to this selection for the type of devices. The selection is an example of the embodiments of the present invention.

The first device 102 can include a first control unit 212, a first storage unit 214, a first communication unit 216, a first user interface 218, and a first location unit 220. The first control unit 212 can include a first control interface 222. The first control unit 212 can execute a first software 226 to provide the intelligence of the electronic system 100. The first control unit 212 can be implemented in a number of different manners.

For example, the first control unit 212 can be a processor, an embedded processor, a microprocessor, a hardware control logic, a hardware finite state machine (FSM), a digital signal processor (DSP), or a combination thereof. The first control interface 222 can be used for communication between the first control unit 212 and other functional units in the first device 102. The first control interface 222 can also be used for communication that is external to the first device 102.

The first control interface 222 can receive information from the other functional units or from external sources, or can transmit information to the other functional units or to external destinations. The external sources and the external destinations refer to sources and destinations external to the first device 102.

The first control interface 222 can be implemented in different ways and can include different implementations depending on which functional units or external units are being interfaced with the first control interface 222. For example, the first control interface 222 can be implemented with a pressure sensor, an inertial sensor, a microelectromechanical system (MEMS), optical circuitry, waveguides, wireless circuitry, wireline circuitry, or a combination thereof.

The first location unit 220 can generate a location information, a heading, and a speed of the first device 102, as examples. The first location unit 220 can be implemented in many ways. For example, the first location unit 220 can function as at least a part of a global positioning system (GPS), an inertial navigation system such as a gyroscope, an accelerometer, a magnetometer, a compass, a spectrum analyzer, a beacon, a cellular-tower location system, a pressure location system, or any combination thereof.

The first location unit 220 can include a first location interface 232. The first location interface 232 can be used for communication between the first location unit 220 and other functional units in the first device 102. The first location interface 232 can also be used for communication that is external to the first device 102.

The first location interface 232 can receive information from the other functional units or from external sources, or can transmit information to the other functional units or to external destinations. The external sources and the external destinations refer to sources and destinations external to the first device 102.

The first location interface 232 can include different implementations depending on which functional units or external units are being interfaced with the first location unit 220. The first location interface 232 can be implemented with technologies and techniques similar to the implementation of the first control interface 222.

The first storage unit 214 can store the first software 226. The first storage unit 214 can also store relevant information, such as advertisements, biometric information, points of interest (POIs), navigation routing entries, reviews/ratings, feedback, or any combination thereof.

The first storage unit 214 can be a volatile memory, a nonvolatile memory, an internal memory, an external memory, or a combination thereof. For example, the first storage unit 214 can be a nonvolatile storage such as non-volatile random access memory (NVRAM), Flash memory, disk storage, or a volatile storage such as static random access memory (SRAM).

The first storage unit 214 can include a first storage interface 224. The first storage interface 224 can be used for communication between the first storage unit 214 and other functional units in the first device 102. The first storage interface 224 can also be used for communication that is external to the first device 102.

The first storage interface 224 can receive information from the other functional units or from external sources, or can transmit information to the other functional units or to external destinations. The external sources and the external destinations refer to sources and destinations external to the first device 102.

The first storage interface 224 can include different implementations depending on which functional units or external units are being interfaced with the first storage unit 214. The first storage interface 224 can be implemented with technologies and techniques similar to the implementation of the first control interface 222.

The first communication unit 216 can enable external communication to and from the first device 102. For example, the first communication unit 216 can permit the first device 102 to communicate with the second device 106 of FIG. 1, an attachment such as a peripheral device or a notebook computer, and the communication path 104.

The first communication unit 216 can also function as a communication hub allowing the first device 102 to function as part of the communication path 104 and not limited to be an end point or terminal unit to the communication path 104. The first communication unit 216 can include active and passive components, such as microelectronics or an antenna, for interaction with the communication path 104.

The first communication unit 216 can include a first communication interface 228. The first communication interface 228 can be used for communication between the first communication unit 216 and other functional units in the first device 102. The first communication interface 228 can receive information from the other functional units or can transmit information to the other functional units.

The first communication interface 228 can include different implementations depending on which functional units are being interfaced with the first communication unit 216. The first communication interface 228 can be implemented with technologies and techniques similar to the implementation of the first control interface 222.

The first user interface 218 allows a user (not shown) to interface and interact with the first device 102. The first user interface 218 can include an input device and an output device. Examples of the input device of the first user interface 218 can include a microphone, a keypad, a touchpad, soft-keys, a keyboard, or any combination thereof to provide data and communication inputs.

Examples of the output device of the first user interface 218 can include a first display interface 230. The first display interface 230 can include a display, a projector, a video screen, a speaker, or any combination thereof.

The first control unit 212 can operate the first user interface 218 to display information generated by the electronic system 100. The first control unit 212 can also execute the first software 226 for the other functions of the electronic system 100, including receiving location information from the first location unit 220. The first control unit 212 can further execute the first software 226 for interaction with the communication path 104 via the first communication unit 216.

The second device 106 can be optimized for implementing the various embodiments in a multiple device embodiment with the first device 102. The second device 106 can provide the additional or higher performance processing power compared to the first device 102. The second device 106 can include a second control unit 234, a second communication unit 236, a second user interface 238, and a second location unit 252.

The second user interface 238 allows the user to interface and interact with the second device 106. The second user interface 238 can include an input device and an output device.

Examples of the input device of the second user interface 238 can include a microphone, a keypad, a touchpad, soft-keys, a keyboard, or any combination thereof to provide data and communication inputs.

Examples of the output device of the second user interface 238 can include a second display interface 240. The second display interface 240 can include a display, a projector, a video screen, a speaker, or any combination thereof.

The second location unit 252 can generate a location information, a heading, and a speed of the first device 102, as examples. The second location unit 252 can be implemented in many ways. For example, the second location unit 252 can function as at least a part of a global positioning system (GPS), an inertial navigation system such as a gyroscope, an accelerometer, a magnetometer, a compass, a spectrum analyzer, a beacon, a cellular-tower location system, a pressure location system, or any combination thereof.

The second location unit 252 can include a second location interface 254. The second location interface 254 can be used for communication between the second location unit 252 and other functional units in the second device 106. The second location interface 254 can also be used for communication that is external to the second device 106.

The second location interface 254 can receive information from the other functional units or from external sources, or can transmit information to the other functional units or to external destinations. The external sources and the external destinations refer to sources and destinations external to the second device 106.

The second location interface 254 can include different implementations depending on which functional units or external units are being interfaced with the second location unit 252. The second location interface 254 can be implemented with technologies and techniques similar to the implementation of the second control interface 244.

The second control unit 234 can execute a second software 242 to provide the intelligence of the second device 106 of the electronic system 100. The second software 242 can operate in conjunction with the first software 226. The second control unit 234 can provide additional performance compared to the first control unit 212.

The second control unit 234 can operate the second user interface 238 to display information. The second control unit 234 can also execute the second software 242 for the other functions of the electronic system 100, including operating the second communication unit 236 to communicate with the first device 102 over the communication path 104.

The second control unit 234 can be implemented in a number of different manners. For example, the second control unit 234 can be a processor, an embedded processor, a microprocessor, a hardware control logic, a hardware finite state machine (FSM), a digital signal processor (DSP), or a combination thereof.

The second control unit 234 can include a second controller interface 244. The second controller interface 244 can be used for communication between the second control unit 234 and other functional units in the second device 106. The second controller interface 244 can also be used for communication that is external to the second device 106.

The second controller interface 244 can receive information from the other functional units or from external sources, or can transmit information to the other functional units or to external destinations. The external sources and the external destinations refer to sources and destinations external to the second device 106.

The second controller interface 244 can be implemented in different ways and can include different implementations depending on which functional units or external units are being interfaced with the second controller interface 244. For example, the second controller interface 244 can be implemented with a pressure sensor, an inertial sensor, a microelectromechanical system (MEMS), optical circuitry, waveguides, wireless circuitry, wireline circuitry, or a combination thereof.

A second storage unit 246 can store the second software 242. The second storage unit 246 can also store the relevant information, such as advertisements, biometric information, points of interest, navigation routing entries, reviews/ratings, feedback, or any combination thereof. The second storage unit 246 can be sized to provide the additional storage capacity to supplement the first storage unit 214.

For illustrative purposes, the second storage unit 246 is shown as a single element, although it is understood that the second storage unit 246 can be a distribution of storage elements. Also for illustrative purposes, the electronic system 100 is shown with the second storage unit 246 as a single hierarchy storage system, although it is understood that the electronic system 100 can have the second storage unit 246 in a different configuration. For example, the second storage unit 246 can be formed with different storage technologies forming a memory hierarchal system including different levels of caching, main memory, rotating media, or off-line storage.

The second storage unit 246 can be a volatile memory, a nonvolatile memory, an internal memory, an external memory, or a combination thereof. For example, the second storage unit 246 can be a nonvolatile storage such as non-volatile random access memory (NVRAM), Flash memory, disk storage, or a volatile storage such as static random access memory (SRAM).

The second storage unit 246 can include a second storage interface 248. The second storage interface 248 can be used for communication between the second storage unit 246 and other functional units in the second device 106. The second storage interface 248 can also be used for communication that is external to the second device 106.

The second storage interface 248 can receive information from the other functional units or from external sources, or can transmit information to the other functional units or to external destinations. The external sources and the external destinations refer to sources and destinations external to the second device 106.

The second storage interface 248 can include different implementations depending on which functional units or external units are being interfaced with the second storage unit 246. The second storage interface 248 can be implemented with technologies and techniques similar to the implementation of the second controller interface 244.

The second communication unit 236 can enable external communication to and from the second device 106. For example, the second communication unit 236 can permit the second device 106 to communicate with the first device 102 over the communication path 104.

The second communication unit 236 can also function as a communication hub allowing the second device 106 to function as part of the communication path 104 and not limited to be an end point or terminal unit to the communication path 104. The second communication unit 236 can include active and passive components, such as microelectronics or an antenna, for interaction with the communication path 104.

The second communication unit 236 can include a second communication interface 250. The second communication interface 250 can be used for communication between the second communication unit 236 and other functional units in the second device 106. The second communication interface 250 can receive information from the other functional units or can transmit information to the other functional units.

The second communication interface 250 can include different implementations depending on which functional units are being interfaced with the second communication unit 236. The second communication interface 250 can be implemented with technologies and techniques similar to the implementation of the second controller interface 244.

The first communication unit 216 can couple with the communication path 104 to send information to the second device 106 in the first device transmission 208. The second device 106 can receive information in the second communication unit 236 from the first device transmission 208 of the communication path 104.

The second communication unit 236 can couple with the communication path 104 to send information to the first device 102 in the second device transmission 210. The first device 102 can receive information in the first communication unit 216 from the second device transmission 210 of the communication path 104. The electronic system 100 can be executed by the first control unit 212, the second control unit 234, or a combination thereof.

For illustrative purposes, the second device 106 is shown with the partition having the second user interface 238, the second storage unit 246, the second control unit 234, and the second communication unit 236, although it is understood that the second device 106 can have a different partition. For example, the second software 242 can be partitioned differently such that some or all of its function can be in the second control unit 234 and the second communication unit 236. Also, the second device 106 can include other functional units not shown in FIG. 2 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the electronic system 100 is described by operation of the first device 102 and the second device 106. It is understood that the first device 102 and the second device 106 can operate any of the modules and functions of the electronic system 100. For example, the first device 102 is described to operate the first location unit 220, although it is understood that the second device 106 can also operate the first location unit 220. As an additional example, the second device 106 is described to operate the second location unit 252, although it is understood that the first device 102 can also operate the second location unit 252.

Figure 3:
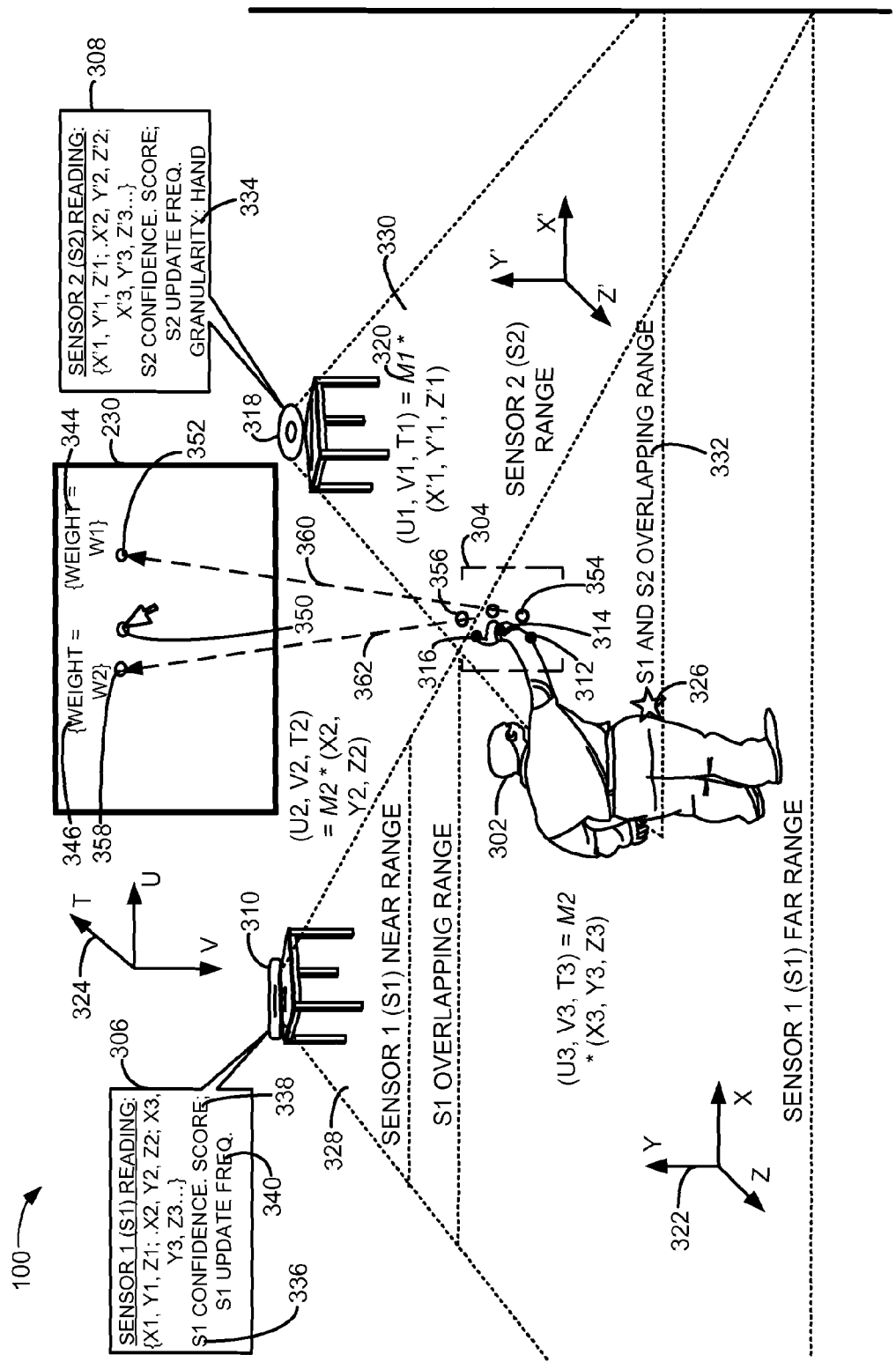
FIG. 3 is an example diagram of the electronic system in operation.

Referring now to FIG. 3, therein is shown an example diagram of the electronic system 100 in operation. FIG. 3 depicts a user 302 undertaking a gesture 304 for controlling the first display interface 230. The gesture 304 represents a motion or positioning of an appendage of the user 302 as captured by a device such as the first device 102 of FIG. 1, the second device 106 of FIG. 1, or a combination thereof. The gesture 304 can include a pointing gesture, a directive gesture, a thumbs-up gesture, an open palm gesture, or a combination thereof. More specifically, the gesture 304 can represent the motion or positioning of the appendage of the user 302 as captured by one or more of the sensors 103 of FIG. 1.

The electronic system 100 can capture the gesture 304 based on a first sensor reading 306, a second sensor reading 308, or a combination thereof. The first sensor reading 306 is data or information received or retrieved from one of the sensors 103 concerning a gesture made by the user 302. The first sensor reading 306 can be data or information received or retrieved from a first sensor 310. The first sensor reading 306 can be data or information received or retrieved from the first sensor 310 at one particular moment in time or over a period of time.

The first sensor 310 can be an instance of the sensors 103 for capturing images, video, or visual spectra and determining spatial locations or distances. For example, the first sensor 310 can include a Microsoft Kinect™ sensor, a Creative Senz3D™ sensor, or a Leap Motion™ sensor.

The first sensor reading 306 can capture an elbow position 312, a hand position 314, a fingertip position 316, or a combination thereof. The elbow position 312 is a spatial position or coordinate for representing an elbow of the user 302. For example, the elbow position 312 can be the spatial position or coordinate of an elbow joint of the user 302 as the user 302 undertakes the gesture 304.

The hand position 314 is a spatial position or coordinate for representing a hand of the user 302. For example, the hand position 314 can be the spatial position or coordinate of a palm, a wrist, or an opisthenar of the user 302 as the user 302 undertakes the gesture 304. The fingertip position 316 is a spatial position or coordinate for representing a fingertip of the user 302.

The second sensor reading 308 can be data or information received or retrieved from another one of the sensors 103 concerning the gesture made by the user 302. The second sensor reading 308 can be data or information received or retrieved from a second sensor 318 different from the first sensor 310. The first sensor reading 306 can be data or information received or retrieved from the second sensor 318 at one particular moment in time or over a period of time.

The second sensor 318 can also be an instance of the sensors 103 for capturing images, video, or visual spectra and determining spatial locations or distances. For example, the second sensor 318 can include the Microsoft Kinect™ sensor, the Creative Senz3D™ sensor, or the Leap Motion™ sensor.

The first sensor reading 306, the second sensor reading 308, or a combination thereof can include coordinates of the gesture 304 in a sensor coordinate system 322. More specifically, the first sensor reading 306, the second sensor reading 308, or a combination thereof can include coordinates of the elbow position 312, the hand position 314, the fingertip position 316, or a combination thereof used to make the gesture 304 in the sensor coordinate system 322.

The sensor coordinate system 322 is a coordinate system associated with one of the sensors 103. For example, the sensor coordinate system 322 can be a coordinate system associated with the first sensor 310, the second sensor 318, or a combination thereof. As will be discussed below, the electronic system 100 can calculate a transformation matrix 320 to transform the coordinates of the gesture 304 in the sensor coordinate system 322 to a uniform coordinate system 324.

The transformation matrix 320 is an array for mapping a spatial position of a point in one coordinate system into another coordinate system. The transformation matrix 320 can be an array of numbers or expressions for changing the spatial position of a point in one coordinate system into another coordinate system. For example, the transformation matrix 320 can be an array of numbers or expression for changing the coordinates of a point in the sensor coordinate system 322 to coordinates in the uniform coordinate system 324.

The uniform coordinate system 324 is a homogenous coordinate system for standardizing distances and positions determined using different spatial coordinates. The uniform coordinate system 324 can be a multidimensional coordinate system such as a two-dimensional coordinate system, a three-dimensional coordinate system, or a combination thereof. The uniform coordinate system 324 can include a common scheme for describing or representing locations for multiple independent devices, such as the first sensor 310 and the second sensor 318.

The uniform coordinate system 324 can be associated with a device in the electronic system 100 such as the first display interface 230, the second display interface 240, or a combination thereof. For example, the uniform coordinate system 324 can be a display coordinate system where the origin of the uniform coordinate system 324 is a screen corner of the display interface.

The user 302 can undertake the gesture 304 from a user location 326. The user location 326 is a geographic location of the user 302. For example, the user location 326 can include a GPS coordinate, a three-dimensional coordinate, a room or enclosure location, or a combination thereof. The user location 326 can also include a position of the user 302 relative to one or more of the devices in the electronic system 100. For example, the user location 326 can include a position of the user 30 relative to the first display interface 230, the first sensor 310, the second sensor 318, or a combination thereof.

The first sensor 310 can include a first range profile 328, a second range profile 330, or a combination thereof. The first range profile 328 is a region where an object or appendage can be captured by the first sensor 310, the second sensor 318, or a combination thereof. The first range profile 328 can be a region within a field of view of the first sensor 310, the second sensor 318, or a combination thereof. The first range profile 328 can be a region where an object or appendage above a threshold size can be captured by the first sensor 310, the second sensor 318, or a combination thereof.

The first range profile 328 can be based on a granularity or sensitivity of the first sensor 310 or the second sensor 318. The first range profile 328 can further be based on an ambient environment surrounding the first sensor 310 or the second sensor 318, including a lighting condition. The first range profile 328 can further be based on a location of the first sensor 310 or the second sensor 318 relative to other objects, an angle of orientation of the first sensor 310 or the second sensor 318, or a combination thereof.

For example, the first range profile 328 can be the region where appendages larger than a threshold size can be captured by the first sensor 310 or the second sensor 318. As a more specific example, the first range profile 328 can be the region where appendages larger than a hand can be captured by the first sensor 310 or the second sensor 318.

The second range profile 330 can be an additional region extending beyond the first range profile 328. The second range profile 330 can also be a region where an object or appendage can be captured by one of the sensors 103 other than the sensor associated with the first range profile 328. For example, the first range profile 328 can be associated with the first sensor 310, in this example, the second range profile 330 can be a region where an appendage of the user 302 can be captured by the second sensor 318.

When the first range profile 328 and the second range profile 330 are both associated with either the first sensor 310 or the second sensor 318, the second range profile 330 can be an additional region extending beyond the first range profile 328.

When the first range profile 328 is associated with the first sensor 310 and the second range profile 330 is associated with the second sensor 318, the second range profile 330 can be a region where an object or appendage can be captured by the second sensor 318. The second range profile 330 can be a region within a field of view of the second sensor 318. The second range profile 330 can also be a region where an object or appendage above a threshold size can be captured by the second sensor 318.

For example, the first range profile 328 can be the region within the field of view of the first sensor 310 where appendages larger than or equal to an average human hand can be captured by the first sensor 310. In this example, the second range profile 330 can be the region where appendages larger than or equal to an average human fingertip can be captured by the second sensor 318.

The first range profile 328 and the second range profile 330 can overlap to produce an overlapping range profile 332. The overlapping range profile 332 is a region included in or encompassing the first range profile 328 and the second range profile 330.

When the first range profile 328 and the second range profile 330 both refer to regions covered by either the first sensor 310 or the second sensor 318, the overlapping range profile 332 can be a smaller instance of the total region covered by either the first sensor 310 or the second sensor 318. In addition, when the first range profile 328 refers to the region covered by the first sensor 310 and the second range profile 330 refers to the region covered by the second sensor 318, the overlapping range profile 332 can be a region of intersection between the first range profile 328 and the second range profile 330.

The electronic system 100 can also identify a granularity limitation 334 associated with the first range profile 328, the second range profile 330, or a combination thereof. The granularity limitation 334 is a minimum size threshold for an object or appendage of the user 302 can be captured by the sensors 103. The granularity limitation 334 can be based on an object or appendage size such as the size of a torso, arm, hand, or fingertip. The granularity limitation 334 can also be based on a two-dimensional area such as 5, 10, or 20 square inches.

As depicted in FIG. 3, the first display interface 230 can display a cursor 348 for indicating a position of a blended position indicator 350. The cursor 348 is a graphical icon or marker for showing the blended position indicator 350 on the first display interface 230, the second display interface 240, or a combination thereof.

The blended position indicator 350 is a coordinate or position on a display interface representing an estimated direction of a gesture made by the user 302 at the display interface. The blended position indicator 350 can be a coordinate or position on the first display interface 230 representing the estimated direction of the gesture 304 made by the user 302 at the first display interface 230.

As will be discussed below, the electronic system 100 can calculate the blended position indicator 350 based on a first position indicator 352, a second position indicator 358, or a combination thereof. The first position indicator 352 is a coordinate or position on a display interface representing an intersection point between a first vector 360 and the display interface.

The first vector 360 is a vector representing a possible direction of the gesture 304. The first vector 360 can be calculated from appendage positions of the user 302 captured in a sensor reading. For example, the first vector 360 can be a vector calculated from appendage positions of the user 302 captured by the first sensor reading 306. As a more specific example, the first vector 360 can be a vector calculated from the elbow position 312 and the hand position 314 of the user 302 captured by the first sensor reading 306.

As will be discussed below, the electronic system 100 can apply the transformation matrix 320 to the appendage positions of the user 302 to calculate a transformed origin point 354 and a transformed terminal point 356. The transformed origin point 354 is an origination or commencement point of a vector. The transformed origin point 354 can be calculated by applying the transformation matrix 320 to an appendage position captured in a sensor reading. The transformed terminal point 356 is a directional point of a vector calculated by applying the transformation matrix 320 to an appendage position captured in a sensor reading.

The second position indicator 358 is a coordinate or position on a display interface for representing an intersection point between a second vector 362 and the display interface. The second vector 362 is another vector representing a possible direction of the gesture 304.

For example, the second vector 362 can be a vector calculated from appendage positions of the user 302 captured by the second sensor reading 308. As a more specific example, the second vector 362 can be a vector calculated from the hand position 314 and the fingertip position 316 of the user 302 captured by the second sensor reading 308. The electronic system 100 can calculate the first vector 360, the second vector 362, or a combination thereof based on the transformed origin point 354 and the transformed terminal point 356.

The electronic system 100 can also identify a first sensor characteristic 336 associated with the first sensor reading 306. The first sensor characteristic 336 is an indication of the reliability and frequency of the first sensor reading 306. The first sensor characteristic 336 can include a confidence score 338 and a sensor update frequency 340.

The confidence score 338 is a numeric value indicating a certainty attributed to a sensor reading. For example, the confidence score 338 can be a numeric value indicating the certainty attributed to the first sensor reading 306, the second sensor reading 308, or a combination thereof.

The sensor update frequency 340 is a measure of the number of times one of the sensors 103 generates a sensor reading within a given amount of time. The sensor update frequency 340 can be associated with the number of readings or measurements performed by the sensor in a second, a minute, or another measure of time. For example, the sensor update frequency 340 can be the measure of the number of times the first sensor 310 generates the first sensor reading 306, the second sensor 318 generates the second sensor reading 308, or a combination thereof.

The electronic system 10 can identify a second sensor characteristic 342 associated with the second sensor reading 308. The second sensor characteristic 342 is an indication of the reliability and frequency of the second sensor reading 308. The second sensor characteristic 342 can include the confidence score 338 and the sensor update frequency 340 associated with the second sensor reading 308.

The electronic system 100 can calculate a first weight 344 associated with the first sensor reading 306. The first weight 344 is a multiplier for increasing or decreasing a contribution of the first sensor reading 306 to a calculation of the blended position indicator 350. As will be discussed below, the electronic system 100 can calculate the first weight 344 based on the first sensor characteristic 336.

The electronic system can also calculate a second weight 346 associated with the second sensor reading 308. The second weight 346 is a multiplier for increasing or decreasing a contribution of the second sensor reading 308 to the calculation of the blended position indicator 350. The electronic system 100 can calculate the second weight 346 based on the second sensor characteristic 342.

Figure 4:
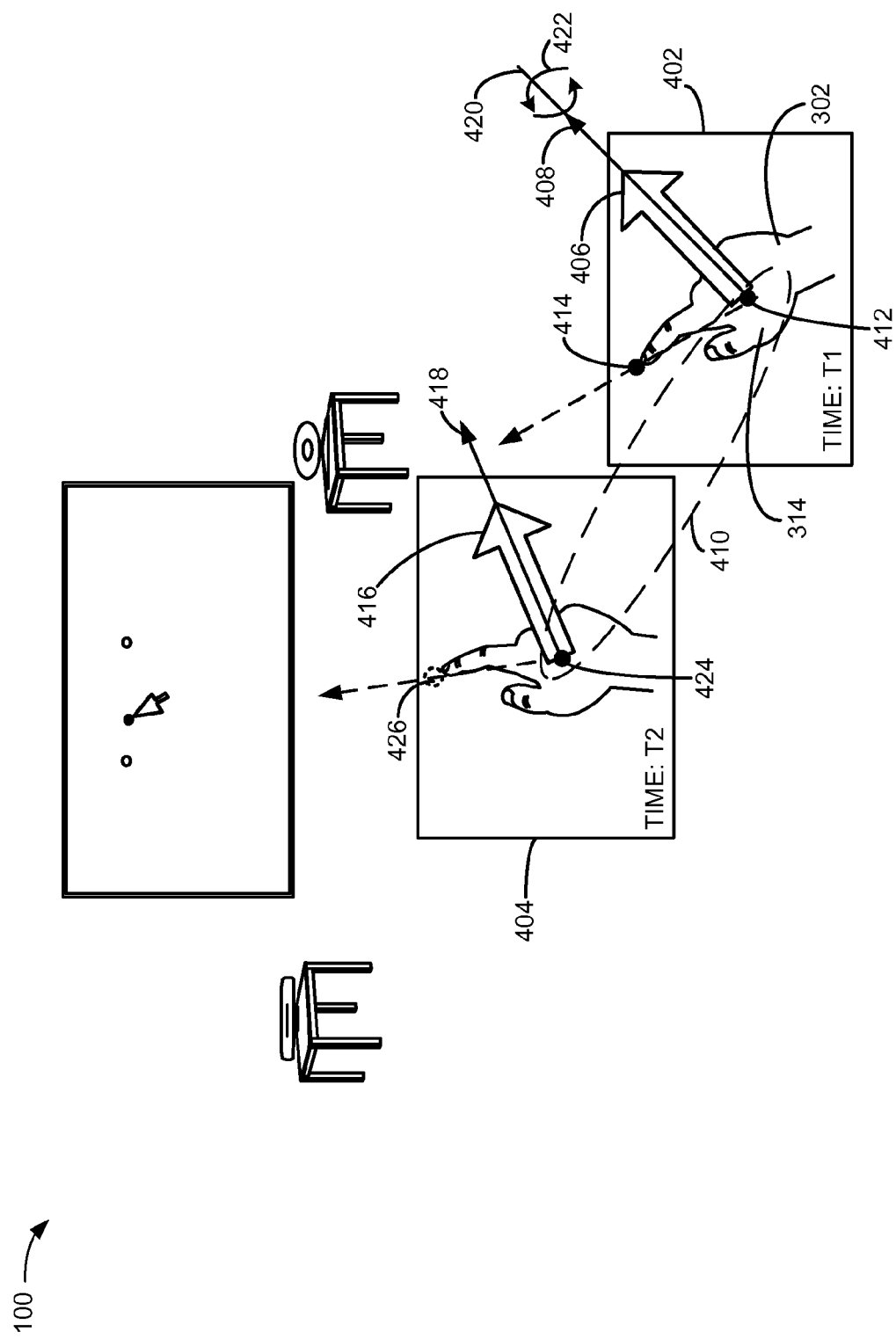
FIG. 4 is another example diagram of the electronic system in operation.

Referring now to FIG. 4, therein is shown another example diagram of the electronic system 100 in operation. FIG. 4 depicts a first sensor frame 402 and a second sensor frame 404.

The first sensor frame 402 is an image captured by one of the sensors 103 depicting an object or subject at an initial point in time. The first sensor frame 402 can be an image of an appendage of the user 302 captured at an initial point in time. For example, the first sensor frame 402 can be captured by the first sensor 310 of FIG. 3, the second sensor 318 of FIG. 3, or a combination thereof.

The second sensor frame 404 is another image captured by one of the sensors 103 depicting an object or subject at a latter point in time. The second sensor frame 404 can be another image captured by one of the sensors 103 depicting the same object or subject depicted in the first sensor frame 402 at a latter point in time. More specifically, the second sensor frame 404 can be another image captured by one of the sensors 103 depicting the same appendage of the user 302 at a latter point in time. For example, the second sensor frame 404 can be captured by the first sensor 310, the second sensor 318, or a combination thereof.

As will be discussed below, the electronic system 100 can determine a first appendage orientation 406 based on one or more appendages depicted in the first sensor frame 402. The first appendage orientation 406 is an alignment or angle of one or more appendages of the user 302. The first appendage orientation 406 can be the spatial positioning of one or more appendages used to make the gesture 304 of FIG. 3.

The electronic system 100 can determine the first appendage orientation 406 based on a first normal vector 408. The first normal vector 408 is a vector orthogonal to plane associated with a skin surface of the user 302. The first normal vector 408 can be a vector orthogonal to a plane associated with an appendage surface of the user 302. More specifically, the first normal vector 408 can be a vector orthogonal to a joint surface of the user 302. In addition, the first normal vector 408 can be a vector orthogonal to a palm center of a hand used to make the gesture 304.

The first sensor frame 402 can include an origination point 410 and a known terminal point 414. The known terminal point 414 represents a point or location on a distal end of an appendage of the user 302 as recognized by the electronic system 100. The origination point 410 represents a point or location proximal or closer to the body of the user 302 than the known terminal point 414 depicted in a sensor frame. For example, the origination point 410 can include a metacarpophalangeal joint, a proximal interphalangeal joint, or a wrist joint. Also, for example, the known terminal point 414 can include a fingertip or a distal interphalangeal joint.

The origination point 410 can include a first origin point 412. The first origin point 412 can represent one instance of the origination point 410 proximal or closer to the body of the user 302 than the known terminal point 414 depicted in the first sensor frame 402. For example, the first origin point 412 can be the elbow position 312 of FIG. 3 of the user 302 and the known terminal point 414 can be the hand position 314 of the user 302 as depicted in the first sensor frame 402.

The electronic system 100 can also determine a second appendage orientation 416 based on the second sensor frame 404. The second appendage orientation 416 is a spatial positioning of one or more appendages of the user 302. The second appendage orientation 416 can be the spatial positioning of one or more appendages used to make the gesture 304.

The electronic system 100 can determine the second appendage orientation 416 based on a second normal vector 418. The second normal vector 418 is a vector orthogonal to the same appendage surface of the user 302 used to determine the first normal vector 408 at a latter point in time. The second normal vector 418 can be a vector orthogonal to the same appendage surface of the appendage used to make the gesture 304.

As will be discussed below, the electronic system 100 can calculate an axis of rotation 420, an angle of rotation 422, or a combination thereof based on the first normal vector 408, the second normal vector 418, or a combination thereof. The axis of rotation 420 is an imaginary line for determining the rotation of a rigid object or body part. The angle of rotation 422 is a measure of how much a rigid object or body part rotates around the axis of rotation 420. The angle of rotation 422 can be calculated in degrees or radians.

The second sensor frame 404 can include a second origin point 424. The second origin point 424 represents another instance of the origination point 410 depicted in the second sensor frame 404. For example, the second origin point 424 can be the hand position 314 of the user 302 as depicted in the second sensor frame 404.

As will be discussed below, the electronic system 100 can also determine an inferred terminal point 426 based on the second origin point 424, the first origin point 412, the known terminal point 414, the first appendage orientation 406, and the second appendage orientation 416. The inferred terminal point 426 represents an inferred distal end of an appendage of the user 302 depicted in the second sensor frame 404. The inferred terminal point 426 can represent an inferred fingertip position of the user 302.

Figure 5:
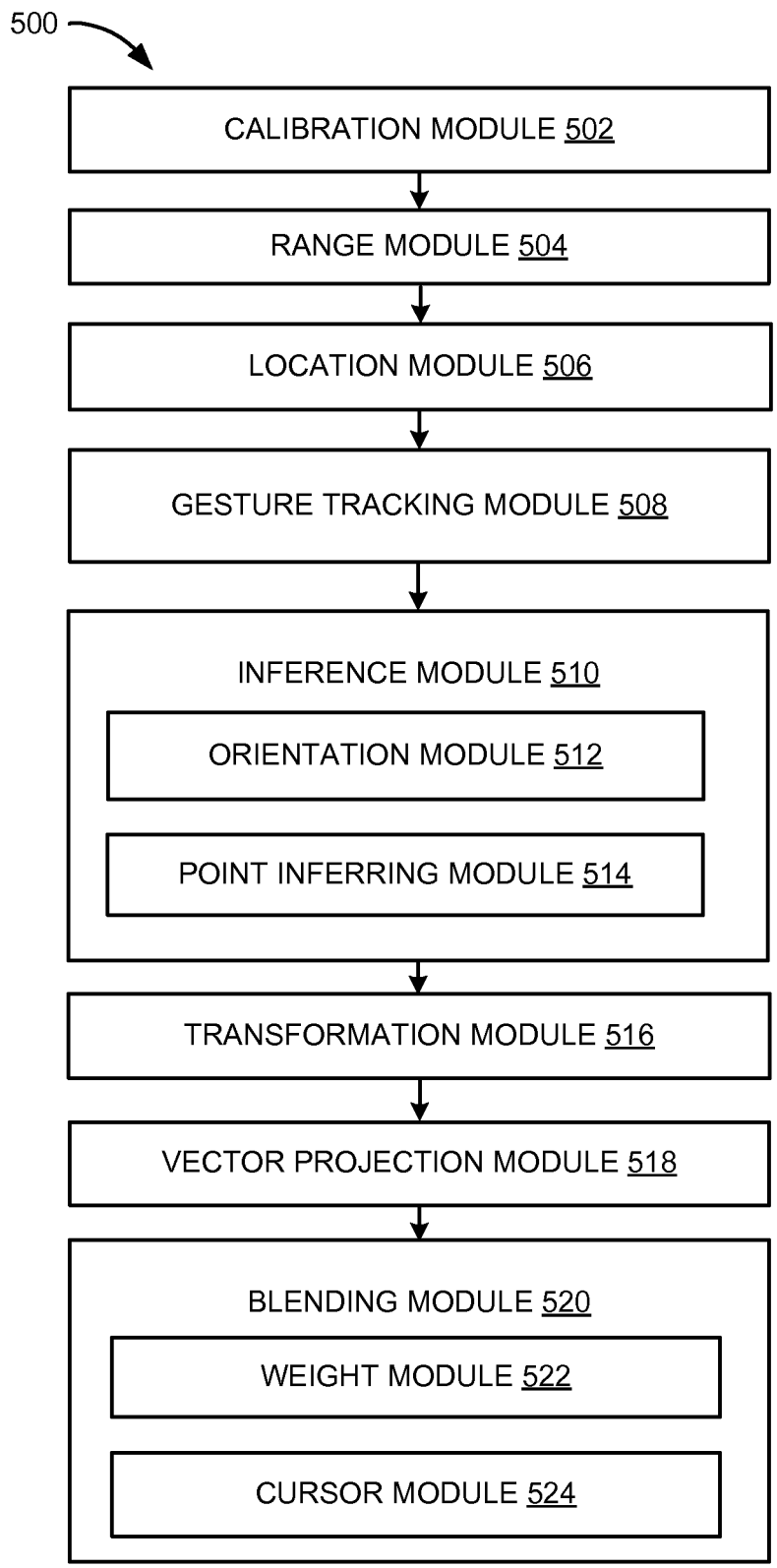
FIG. 5 is a control flow of the electronic system.

Referring now to FIG. 5, therein is shown a control flow 500 of the electronic system 100 of FIG. 1. The electronic system 100 can include a calibration module 502, a range module 504, a location module 506, a gesture tracking module 508, an inference module 510, a transformation module 516, a vector projection module 518, a blending module 520, or a combination thereof.

The calibration module 502 can be coupled to the range module 504. The range module 504 can be further coupled to the location module 506, the location module 506 can be further coupled to the gesture tracking module 508, the gesture tracking module 508 can be further coupled to the inference module 510, the inference module 510 can be further coupled to the transformation module 516, the transformation module 516 can be further coupled to the vector projection module 518, and the vector projection module 518 can be further coupled to the blending module 520.

The modules can be coupled by having the input of one module connected to the output of another module as shown in FIG. 5. The modules can be coupled by using wired or wireless connections, the communication path 104 of FIG. 1, instructional steps, or a combination thereof. The modules can be coupled directly, without any intervening structures other than the structure providing the direct connection. The modules can further be coupled indirectly, through a shared connection or other functional structures between the coupled modules.

The calibration module 502 is configured to calculate one or more instances of the transformation matrix 320 of FIG. 3. The calibration module 502 can calculate the transformation matrix 320 for transforming coordinates in the sensor coordinate system 322 of FIG. 3 to coordinates in the uniform coordinate system 324 of FIG. 3. For example, the calibration module 502 can calculate the transformation matrix 320 for transforming the coordinates of the hand position 314 of FIG. 3, the elbow position 312 of FIG. 3, the fingertip position 316 of FIG. 3, or a combination thereof to their corresponding coordinates in the uniform coordinate system 324.

The calibration module 502 can calculate different instances of the transformation matrix 320 for each of the sensors 103. For example, the calibration module 502 can calculate one instance of the transformation matrix 320 for the first sensor 310 of FIG. 3 and another instance of the transformation matrix 320 for the second sensor 318 of FIG. 3. In this example, the instance of the transformation matrix 320 for the first sensor 310 can be used to transform coordinates in the sensor coordinate system 322 of the first sensor 310 into the uniform coordinate system 324. Also, in this example, the instance of the transformation matrix 320 for the second sensor 318 can be used to transform coordinates in the sensor coordinate system 322 of the second sensor 318 into the uniform coordinate system 324.

The calibration module 502 can calculate the transformation matrix 320 by displaying an array of calibration points on a display interface such as the first display interface 230, the second display interface 240 of FIG. 2, or a combination thereof. The calibration module 502 can display the calibration points in a display coordinate system.

The calibration module 502 can then receive or identify a calibration gesture made by the user 302 of FIG. 3 at one of the calibration points. The calibration gesture can include the gesture 304 of FIG. 3, a palm gesture, an arm gesture, or a combination thereof. The user 302 can make one instance of the calibration gesture from a first position and can make another instance of the calibration gesture from a second position.

The second position can be a geographic position or location different from the first position. For example, the first position can be a left corner of a living room and the second position can be a right corner of the living room.

The calibration module 502 can receive or retrieve one or more sensor readings capturing the coordinates of the calibration gesture in the sensor coordinate system 322. More specifically, the calibration module 502 can receive or retrieve one or more sensor readings capturing the coordinates of appendage positions used to make the calibration gesture. For example, the calibration module 502 can receive or retrieve a sensor reading from the first sensor 310 with the coordinates of the elbow position 312, the hand position 314, the fingertip position 316, or a combination thereof used to make the calibration gesture. The calibration module 502 can receive or retrieve the coordinates of the appendage positions in the sensor coordinate system 322.

The calibration module 502 can generate a first calibration vector based on the coordinates of the appendage positions in the sensor coordinate system 322. The first calibration vector is a vector calculated in the sensor coordinate system 322 representing the direction of the calibration gesture undertaken at the first position.

The calibration module 502 can generate the first calibration vector by projecting a vector connecting two or more coordinates representing the appendage positions of the calibration gesture undertaken at the first position. The calibration module 502 can project the first calibration vector toward the display interface displaying the calibration points. The calibration module 502 can also generate a second calibration vector. The second calibration vector is a vector calculated in the sensor coordinate system 322 representing the direction of the calibration gesture undertaken at the second position.

The calibration module 502 can generate the second calibration vector for intersecting with the first calibration vector to determine an intersection point. The calibration module 502 can generate the second calibration vector by projecting a vector connecting two or more coordinates representing the appendage positions of the calibration gesture undertaken at the second position. The calibration module 502 can project the second calibration vector toward the display interface displaying the calibration points.

The calibration module 502 can then determine the intersection point for representing an intersection between the first calibration vector and the second calibration vector. The calibration module 502 can determine the coordinates of the intersection point in the sensor coordinate system 322. The calibration module 502 can use the first control unit 212 of FIG. 2, the second control unit 234 of FIG. 2, or a combination thereof to determine the coordinates of the intersection point in the sensor coordinate system 322.

The calibration module 502 can calculate the transformation matrix 320 based on the coordinates of the intersection point in the sensor coordinate system 322 and the coordinates of the calibration point in the display coordinate system. The calibration module 502 can take as inputs the coordinates of the intersection point in the sensor coordinate system 322 and the coordinates of the calibration point in the display coordinate system. The calibration module 502 can calculate the transformation matrix 320 for transforming the coordinates of the intersection point in the sensor coordinate system 322 into the coordinates of the calibration point in the display coordinate system.

The calibration module 502 can use the first control unit 212, the second control unit 234, or a combination thereof to calculate the transformation matrix 320 using a least-squares estimation algorithm, a least-squares error minimization method, an absolute orientation least-squares error method, or a combination thereof. The calibration module 502 can calculate the transformation matrix 320 as a closed-form solution using unit quaternions.

The calibration module 502 can calculate a different instance of the transformation matrix 320 for each of the sensors 103. The calibration module 502 can store the instances of the transformation matrix 320 in the first storage unit 214 of FIG. 2, the second storage unit 246 of FIG. 2, or a combination thereof.

The calibration module 502 can be part of the first software 226 of FIG. 2, the second software 242 of FIG. 2, or a combination thereof. The first control unit 212 can execute the first software 226, the second control unit 234 can execute the second software 242, or a combination thereof to calculate the transformation matrix 320.

Moreover, the calibration module 502 can also communicate the transformation matrix 320 between devices through the first communication unit 216 of FIG. 2, the second communication unit 236 of FIG. 2, or a combination thereof. After calculating the transformation matrix 320, the control flow 500 can pass from the calibration module 502 to the range module 504.

The range module 504 is configured to determine the first range profile 328 of FIG. 3, the second range profile 330 of FIG. 3, or a combination thereof. The range module 504 can determine the first range profile 328, the second range profile 330, or a combination thereof based on the granularity or sensitivity of the first sensor reading 306 of FIG. 3, the second sensor reading 308 of FIG. 3, or a combination thereof.

As previously discussed, both the first range profile 328 and the second range profile 330 can be associated with one of the sensors 103 including the first sensor 310 or the second sensor 318. For example, the first range profile 328 can represent a region where one or more appendages of the user 302 above a threshold size can be captured by the first sensor 310. Also, in this example, the second range profile 330 can represent an additional region beyond the first range profile 328 where one or more appendages of the user 302 above a different threshold size can be captured by the first sensor 310.

Also, as previously discussed, the second range profile 330 can be associated with one of the sensors 103 different from the sensor associated with the first range profile 328. For example, the first range profile 328 can be associated with the first sensor 310 and the second range profile 330 can be associated with the second range profile 330. When the second range profile 330 is associated with the second sensor 318, the second range profile 330 can be a region where one or more appendages of the user 302 above a threshold size can be captured by the second sensor 318.

The range module 504 can determine the first range profile 328 by receiving or retrieving one or more boundaries, distances, coordinates, or a combination thereof for demarcating the first range profile 328 from one of the sensors 103. The range module 504 can further determine the first range profile 328 based on identifying one or more of the sensors 103. The range module 504 can determine the first range profile 328 according to a driver associated with one of the sensors 103, a device connected to the electronic system 100, or a combination thereof. In addition, the first range profile 328 can be predetermined by the electronic system 100.

The range module 504 can determine the second range profile 330 by receiving or retrieving one or more boundaries of the second range profile 330 from one of the sensors 103, a driver associated with one of the sensors 103, a device connected to the electronic system 100, or a combination thereof. In addition, the second range profile 330 can be predetermined by the electronic system 100. The range module 504 can also determine the first range profile 328, the second range profile 330, or a combination thereof based on an input from the user 302.

The range module 504 can determine the granularity limitation 334 of FIG. 3 associated with the first range profile 328, the second range profile 330, or a combination thereof. As previously discussed, the granularity limitation 334 is a minimum size threshold above which an object or appendage of the user 302 can be captured by the sensors 103. For example, the granularity limitation 334 can be based on a body part size such as the size of a torso, arm, hand, or fingertip. As an additional example, the granularity limitation 334 can be based on an area such as 5, 10, or 20 square inches.

The range module 504 can determine the granularity limitation 334 by receiving or retrieving the granularity limitation 334 from the first sensor 310, the second sensor 318, or a combination thereof. In addition the range module 504 can determine the granularity limitation 334 by receiving or retrieving the granularity limitation 334 from the user 302 or another device in the electronic system 100.

The range module 504 can also determine the overlapping range profile 332 of FIG. 3. The range module 504 can determine the overlapping range profile 332 based on the first range profile 328 and the second range profile 330. The range module 504 can determine the overlapping range profile 332 as the overlap region between the first range profile 328 and the second range profile 330. The range module 504 can determine the overlapping range profile 332 by comparing the coordinates of the boundaries associated with the first range profile 328 and the second range profile 330.

When the first range profile 328 is associated with the first sensor 310 and the second range profile 330 is associated with the second sensor 318, the range module 504 can use the transformation matrix 320 associated with the first sensor 310 to transform the coordinates of the boundaries of the first range profile 328 from the sensor coordinate system 322 of the first sensor 310 into the uniform coordinate system 324. In addition, the range module 504 can also use the transformation matrix 320 associated with the second sensor 318 to transform the coordinates of the boundaries of the second range profile 330 from the sensor coordinate system 322 of the second sensor 318 into the uniform coordinate system 324.

The range module 504 can determine the overlapping range profile 332 by comparing the boundaries of the first range profile 328 and the boundaries of the second range profile 330 in the uniform coordinate system 324. Moreover, when the first range profile 328 and the second range profile 330 are both associated with one of the sensors 103, such as the first sensor 310 or the second sensor 318, the range module 504 can determine the overlapping range profile 332 in the sensor coordinate system 322. The range module 504 can determine the overlapping range profile 332 based on a predetermined distance below and above a location or a distance associated with a division between modes, circuitry, device portions, ranges, granularity levels, measurement confidence level, or a combination thereof.

The range module 504 can store the first range profile 328, the second range profile 330, the overlapping range profile 332, or a combination thereof in the first storage unit 214, the second storage unit 246, or a combination thereof. The range module 504 also store the granularity limitation 334 associated with the first range profile 328, the second range profile 330, or a combination thereof in the first storage unit 214, the second storage unit 246, or a combination thereof.

The range module 504 can be part of the first software 226, the second software 242, or a combination thereof. The first control unit 212 can execute the first software 226, the second control unit 234 can execute the second software 242, or a combination thereof to determine the first range profile 328, the second range profile 330, the granularity limitation 334, or a combination thereof.

Moreover, the range module 504 can also communicate the first range profile 328, the second range profile 330, the granularity limitation 334, or a combination thereof between devices through the first communication unit 216, the second communication unit 236, or a combination thereof. After determining the first range profile 328, the second range profile 330, the granularity limitation 334, or a combination thereof, the control flow 500 can pass from the range module 504 to the location module 506.

The location module 506 is configured to determine the user location 326 of FIG. 3. The location module 506 can determine the user location 326 based on a device location, the first sensor reading 306, the second sensor reading 308, or a combination thereof. The location module 306 can also determine the user location 326 based on the calibration procedure.

The location module 506 can determine the user location 326 based on the device location of a device carried by the user 302. For example, the location module 506 can determine the user location 326 based on the device location of the first device 102, the second device 106, or a combination thereof carried by the user 302. As a more specific example, the first device 102 can be a mobile device such as a cellular phone, a tablet device, or a wearable device and the location module 506 can determine the user location 326 based on the mobile device worn or held by the user 302.

The location module 506 can determine the user location 326 based on the device location by using the first location unit 220 of FIG. 2, the second location unit 252 of FIG. 2, or a combination thereof. In addition, the location module 506 can determine the user location 326 based on the device location by using a multilateration (MLAT) technique or a triangulation technique using the first communication unit 216, the second communication unit 236, or a combination thereof. For example, the location module 506 can use the GPS component of the first location unit 220, the Bluetooth™ component of the first communication unit 216, or a combination thereof to determine the user location 326 based on the device location of the first device 102.

The location module 506 can also determine the user location 326 based on the first sensor reading 306, the second sensor reading 308, or a combination thereof. The location module 506 can determine the user location 326 based on a distance measurement, a location estimation, a size measurement, or a combination thereof from the first sensor reading 306, the second sensor reading 308, or a combination thereof. For example, the location module 506 can determine the user location 326 based on the distance measurement, a location estimation, a size measurement, or a combination thereof of a body part of the user 302 such as a torso, a head, an arm, a leg, or a combination thereof.

Once the location module 506 has determined the user location 326, the location module 506 can also determine whether the user location 326 is within the first range profile 328, the second range profile 330, or the overlapping range profile 332. The location module 506 can determine whether the user location 326 is within the first range profile 328, the second range profile 330, or the overlapping range profile 332 by transforming one or more coordinates of the user location 326 into the uniform coordinate system 324.

For example, the location module 506 can interact with the transformation module 516 to transform the coordinates of the user location 326 in the sensor coordinate system 322 to the uniform coordinate system 324 using the transformation matrix 320. The location module 506 can then determine if the user location 326 is within the first range profile 328, the second range profile 330, or the overlapping range profile 332 by comparing the coordinates of the user location 326 to the boundaries of the first range profile 328 and the boundaries of the second range profile 330.

The location module 506 can be part of the first software 226, the second software 242, or a combination thereof. The first control unit 212 can execute the first software 226, the second control unit 234 can execute the second software 242, or a combination thereof to determine the user location 326.

Moreover, the location module 506 can also communicate the user location 326 between devices through the first communication unit 216, the second communication unit 236, or a combination thereof. After determining the user location 326, the control flow 500 can pass from the location module 506 to the gesture tracking module 508.

The gesture tracking module 508 is configured to determine one or more instances of the origination point 410 of FIG. 4 and the known terminal point 414 of FIG. 4. The gesture tracking module 508 can determine one or more instances of the origination point 410 and the known terminal point 414 based on the user location 326, the first range profile 328, the second range profile 330, the first sensor reading 306, the second sensor reading 308, the granularity limitation 334, or a combination thereof.

The gesture tracking module 508 can use the user location 326 to determine the presence of the user 302 in the first range profile 328, the second range profile 330, or the overlapping range profile 332. As previously discussed, the first range profile 328 and the second range profile 330 can refer to coverage areas associated with different sensors. For example, the first range profile 328 can be associated with the first sensor 310 and the second range profile 330 can be associated with the second sensor 318.

The gesture tracking module 508 can identify the first sensor reading 306 when the user location 326 is determined to be in the first range profile 328 and outside of the overlapping range profile 332. The gesture tracking module 508 can identify the first sensor reading 306 for capturing the gesture 304 using the first sensor 310. The first sensor 310 can capture the coordinates of the gesture 304 in the sensor coordinate system 322 of the first sensor 310.

The gesture tracking module 508 can identify the second sensor reading 308 when the user location 326 is determined to be in the second range profile 330 and outside of the overlapping range profile 332. The gesture tracking module 508 can identify the second sensor reading 308 for capturing the gesture 304 using the second sensor 318. The second sensor 318 can capture the coordinates of the gesture 304 in the sensor coordinate system 322 of the second sensor 318.

The gesture tracking module 508 can identify both the first sensor reading 306 and the second sensor reading 308 when the user location 326 is in the overlapping range profile 332. In this instance, the overlapping range profile 332 refers to a region of intersection between the first range profile 328 associated with the first sensor 310 and the second range profile 330 associated with the second sensor 318.

Also, as previously discussed, both the first range profile 328 and the second range profile 330 can refer to coverage areas associated with the same sensor. For example, the first range profile 328 can be associated with a near range of the first sensor 310, and the second range profile 330 can be associated with a far range of the first sensor 310. In this example, the gesture tracking module 508 can identify the first sensor reading 306 when the user location 326 is in any of the first range profile 328, the second range profile 330, or the overlapping range profile 332.

The gesture tracking module 508 can identify the first sensor reading 306 or the second sensor reading 308 by accessing a sensor log of the first sensor 310 or the second sensor 318, respectively. In addition, the gesture tracking module 508 can identify the first sensor reading 306 or the second sensor 318 reading by interfacing with the first sensor 310 or the second sensor 318, respectively, through an application programming interface (API). Moreover, the gesture tracking module 508 can identify the first sensor reading 306 or the second sensor reading 308 by querying the first sensor 310 or the second sensor 318, respectively.

The first sensor reading 306, the second sensor reading 308, or a combination thereof can include the coordinates of appendage positions used to make the gesture 304. For example, the first sensor reading 306 can include the coordinates of the elbow position 312 and the coordinates of the hand position 314 in the sensor coordinate system 322. Also, for example, the second sensor reading 308 can include the coordinates of the hand position 314 and the fingertip position 316 in the sensor coordinate system 322.

The gesture tracking module 508 can determine one or more instances of the origination point 410 and the known terminal point 414 based on the first sensor reading 306, the second sensor reading 308, and the granularity limitation 334. The gesture tracking module 508 can determine the known terminal point 414 based on a size of the appendage used to make the gesture 304 and the granularity limitation 334 of the first range profile 328, the second range profile 330, or a combination thereof.

The gesture tracking module 508 can further include shape templates, orders of appendage connections, or a combination thereof predetermined by the computing system 100. The gesture tracking module 508 can use the templates, the orders, or a combination thereof to identify the known terminal point 414 as the most distal point on the user's body as recognized in the sensor readings. The gesture tracking module 508 can similarly use the templates, the orders, or a combination thereof to identify the origination point 410 as the immediately adjacent point or joint on the user's body as recognized in the sensor readings, such as a hand relative to a finger or an elbow relative to a wrist.

The gesture tracking module 508 can determine the known terminal point 414 by selecting the smallest appendage included as part of the gesture 304 corresponding to or exceeding the granularity limitation 334. The gesture tracking module 508 can select the smallest appendage included as part of the gesture 304 from the first sensor reading 306, the second sensor reading 308, or a combination thereof.

For example, the user location 326 can be in the first range profile 328 and the granularity limitation 334 of the first range profile 328 can be the size of an average human hand. In this example, the gesture tracking module 508 can determine the known terminal point 414 as the coordinates of the hand of the user 302 used to make the gesture 304.

As an additional example, the user location 326 can be in the second range profile 330 and the granularity limitation 334 of the second range profile 330 can be size of an average human fingertip. In this example, the gesture tracking module 508 can determine the known terminal point 414 as the coordinates of the fingertip of the user 302 used to make the gesture 304.

The gesture tracking module 508 can determine the origination point 410 as an appendage of the user 302 separate from the appendage associated with the known terminal point 414. For example, the gesture tracking module 508 can determine the origination point 410 as another appendage used to make the gesture 304 located proximal or closer to a torso or body of the user 302. As another example, the gesture tracking module 508 can determine the origination point 410 as the next largest appendage located proximal closer to the torso or body of the user 302 and exceeding the granularity limitation 334.

When the user location 326 is determined to be in the overlapping range profile 332, the gesture tracking module 508 can determine multiple instances of the known terminal point 414 and the origination point 410 based on the first sensor reading 306, the second sensor reading 308, or a combination thereof. The gesture tracking module 508 can determine different instances of the known terminal point 414 or the origination point 410 in different sensor coordinate systems.

For example, the gesture tracking module 508 can determine one instance of the known terminal point 414 as the fingertip position 316 of the user 302 in the sensor coordinate system 322 of the first sensor 310. In this example, the gesture tracking module 508 can also determine another instance of the known terminal point 414 as the fingertip position 316 of the user 302 in the sensor coordinate system 322 of the second sensor 318.

The gesture tracking module 508 can also determine different instances of the known terminal point 414 or the origination point 410 based on differences in the granularity limitation 334 of the first range profile 328 and the second range profile 330. For example, the granularity limitation 334 of the first range profile 328 can be the size of a human hand. In this example, the gesture tracking module 508 can determine one instance of the origination point 410 as the elbow of the user 302 and one instance of the known terminal point 414 as the hand of the user 302 from the first sensor reading 306.

Also, for example, the granularity limitation 334 of the second range profile 3330 can be the size of a human fingertip. In this example, the gesture tracking module 508 can determine another instance of the origination point 410 as the hand of the user 302 and another instance of the known terminal point 414 as the fingertip of the user 302 from the second sensor reading 308.

As previously discussed, the overlapping range profile 332 can refer to a region of overlap associated with the coverage areas for one sensor, such as the first sensor 310 or the second sensor 318. In this instance, the gesture tracking module 508 can also determine multiple instances of the known terminal point 414 and the origination point 410 based on differences in the granularity limitation 334 of the first range profile 328 and the second range profile 330 associated with the single sensor. Also, when the overlapping range profile 332 refers to a region of overlap associated with the coverage areas for one sensor, the gesture tracking module 508 can obtain the coordinates of the appendage positions from one of the first sensor reading 306 or the second sensor reading 308.

For example, the granularity limitation 334 of a near range representing the first range profile 328 of the first sensor 310 can be the size of a fingertip. Also, in this example, the granularity limitation 334 of a far range representing the second range profile 330 of the first sensor 310 can be the size of a hand. Continuing with this example, the gesture tracking module 508 can determine one instance of the known terminal point 414 as the fingertip position 316 and another instance of the known terminal point 414 as the hand position 314.

The first sensor reading 306, the second sensor reading 308, or a combination thereof can include the confidence score 338 of FIG. 3, the sensor update frequency 340, or a combination thereof. The first sensor reading 306 can include the confidence score 338 associated with each appendage position captured by the first sensor 310. In addition, the second sensor reading 308 can include the confidence score 338 associated with each appendage position captured by the second sensor 318.

The first sensor reading 306, the second sensor reading 308, or a combination thereof can also include the sensor update frequency 340. The gesture tracking module 508 can determine the sensor update frequency 340 by counting each time the first sensor 310 or the second sensor 318 undertakes a sensor reading. The gesture tracking module 508 can determine the sensor update frequency 340 based on a number of times the first sensor 310 generates the first sensor reading 306, the number of times the second sensor 318 generates the second sensor reading 308, or a combination thereof. The gesture tracking module 508 can further determine the sensor update frequency 340 based on a status report, a setting or a configuration, a mode or a state, or a combination thereof as reported by the corresponding sensor.

The gesture tracking module 508 can store the known terminal point 414, the origination point 410, the first sensor reading 306, the second sensor reading 308, the confidence score 338, the sensor update frequency 340, or a combination thereof in the first storage unit 214, the second storage unit 246, or a combination thereof. The gesture tracking module 508 can be part of the first software 226, the second software 242, or a combination thereof. The first control unit 212 can execute the first software 226, the second control unit 234 can execute the second software 242, or a combination thereof to determine the known terminal point 414, the origination point 410, or a combination thereof.

Moreover, the gesture tracking module 508 can also communicate the known terminal point 414, the origination point 410, or a combination thereof between devices through the first communication unit 216, the second communication unit 236, or a combination thereof. After determining the known terminal point 414, the origination point 410, or a combination thereof, the control flow 500 can pass from the gesture tracking module 508 to the inference module 510.

The inference module 510 is configured to calculate the inferred terminal point 426 of FIG. 4. The inference module 510 can calculate the inferred terminal point 426 for inferring an unknown appendage position not captured by the sensors 103. For example, the inference module 510 can calculate the inferred terminal point 426 representing the fingertip position 316 of the user 302.

The inference module 510 can calculate the inferred terminal point 426 when an appendage position is obscured or unclear in a sensor frame, not provided by the sensor, or a combination thereof. More specifically, the inference module 510 can calculate the inferred terminal point 426 when an appendage position is obscured or unclear in the second sensor frame 404 of FIG. 4. The inference module 510 can calculate the inferred terminal point 426 in the second sensor frame 404 by analyzing the second sensor frame 404 and the first sensor frame 402 of FIG. 4.

For example, the first sensor frame 402 can be an image captured by one of the sensors 103 depicting an appendage of the user 302 at an initial point in time. In this example, the second sensor frame 404 can be an image captured by the same instance of the sensors 103 depicting the same appendage of the user 302 at a latter point in time.

The first sensor frame 402 and the second sensor frame 404 can be included in sensor readings identified from the first sensor 310, the second sensor 318, or a combination thereof. More specifically, the first sensor frame 402 and the second sensor frame 404 can be included in the first sensor reading 306 associated with the first sensor 310. In addition, the first sensor frame 402 and the second sensor frame 404 can be included in the second sensor reading 308 associated with the second sensor 318.

The inference module 510 can interact with the gesture tracking module 508 to determine the first origin point 412 of FIG. 4 and the known terminal of FIG. 4 from the first sensor frame 402 included in the first sensor reading 306, the second sensor reading 308, or a combination thereof. In addition, the inference module 510 can interact with the gesture tracking module 508 to determine the second origin point 424 of FIG. 4 from the second sensor frame 404 included in the first sensor reading 306, the second sensor reading 308, or a combination thereof.

The inference module 510 can include an orientation module 512, a point inferring module 514, or a combination thereof. The orientation module 512 is configured to determine the first appendage orientation 406 of FIG. 4, the second appendage orientation 416 of FIG. 4, or a combination thereof. The orientation module 512 can determine the first appendage orientation 406 based on the first sensor frame 402. The orientation module 512 can determine the second appendage orientation 416 based on the second sensor frame 404.

The orientation module 512 can determine the first appendage orientation 406 by determining the first normal vector 408 of FIG. 4. The orientation module 512 can determine the second appendage orientation 416 by determining the second normal vector 418 of FIG. 4. For example, the orientation module 512 can determine the first normal vector 408, the second normal vector 418, or a combination thereof by determining a vector orthogonal to a palm surface, an opisthenar surface, a wrist surface, or an elbow surface of the user 302.

Also for example, the orientation module 512 can determine the first normal vector 408, the second normal vector 418, or a combination thereof using one or more shape profiles or templates. Also for example, the orientation module 512 can determine the first normal vector 408, the second normal vector 418, or a combination thereof by receiving the normal vector readings from the corresponding sensor.

The orientation module 512 can determine the first normal vector 408 by calculating a vector orthogonal to an appendage surface depicted in the first sensor frame 402. The orientation module 512 can determine the second normal vector 418 by calculating a vector orthogonal to the same appendage surface used to determine the first normal vector 408 in the second sensor frame 404.

The orientation module 512 can use the first control unit 212, the second control unit 234, or a combination thereof to calculate the first normal vector 408, the second normal vector 418, or a combination thereof. The orientation module 512 can use the first control unit 212, the second control unit 234, or a combination thereof to calculate the first normal vector 408 or the second normal vector 418 using a contour or surface outline of the appendage depicted in the first sensor frame 402 or the second sensor frame 404, respectively.

In addition, the orientation module 512 can use the first communication interface 228 of FIG. 2, the second communication interface 250 of FIG. 2, or a combination thereof to receive or retrieve the first normal vector 408, the second normal vector 418, or a combination thereof from the sensors 103. For example, the first normal vector 408 and the second normal vector 418 can be included in communications received or retrieved from the first sensor 310, the second sensor 318, or a combination thereof.

The point inferring module 514 is configured to calculate the inferred terminal point 426. The point inferring module 514 can calculate the inferred terminal point 426 by treating one or more appendages used to make the gesture 304 as a rigid articulating chain or object unchanging between frames or readings. The point inferring module 514 can calculate the inferred terminal point 426 based on the first origin point 412, the second origin point 424, the known terminal point 414, the first appendage orientation 406, and the second appendage orientation 416.

The point inferring module 514 can calculate the inferred terminal point 426 by calculating the angle of rotation 422 of FIG. 4 and the axis of rotation 420 of FIG. 4. The point inferring module 514 can calculate the angle of rotation 422 based on the first appendage orientation 406 and the second appendage orientation 416. More specifically, the point inferring module 514 can calculate the angle of rotation 422 by taking the cross product of the first normal vector 408 and the second normal vector 418. The angle of rotation 422 can be referred to as "$\vec{a}$", the first normal vector 408 can be referred to as "N1", and the second normal vector 418 can be referred to as "N2". The point inferring module 514 can calculate the angle of rotation 422 according to Equation 1 below.

$$\vec{a} = N1 \times N2 \qquad \text{(Equation 1)}$$

The point inferring module 514 can also calculate the axis of rotation 420. The point inferring module 514 can calculate the axis of rotation 420 by first taking the sine of the angle of rotation 422. The sine of the angle of rotation 422 can be referred to as "S". The point inferring module 514 can calculate the axis of rotation 420 by dividing the angle of rotation 422 by the sine of the angle of rotation 422. The axis of rotation 420 can be referred to as "$\vec{A}$". The point inferring module 514 can calculate the axis of rotation 420 according to Equation 2 below.

$$\vec{A} = \vec{a}/S \qquad \text{(Equation 2)}$$

The point inferring module 514 can calculate the inferred terminal point 426 by applying a rotation formula to the first origin point 412, the second origin point 424, the known terminal point 414, the angle of rotation 422, and the axis of rotation 420. For example, the point inferring module 514 can calculate the inferred terminal point 426 by applying Rodrigues' rotation formula to the first origin point 412, the second origin point 424, the known terminal point 414, the angle of rotation 422, and the axis of rotation 420.

As a more specific example, the first origin point 412 can represent coordinates of the hand position 314 depicted in the first sensor frame 402. The coordinates of the hand position 314 representing the first origin point 412 can be referred to as "H1". In addition, the second origin point 424 can represent coordinates of the hand position 314 depicted in the second sensor frame 404. The coordinates of the hand position 314 representing the second origin point 412 can be referred to as "H2".

Also, in this example, the known terminal point 414 can represent coordinates of the fingertip position 316 depicted in the first sensor frame 402. The fingertip position 316 can be referred to as "F1". Moreover, "C" can refer to the cosine of the angle of rotation 422.

Continuing with this example, the inferred terminal point 426 can be referred to as "F2". The point inferring module 514 can calculate the inferred terminal point 426 or "F2" using Equation 3 below.

$$F2 = H2 + (C*(F1-H1)) + \vec{A} \times (S*(F1-H1)) + ((1-C)*\vec{A}*(\vec{A} \cdot (F1-H1)))$$ (Equation 3)

The inference module 510 can be part of the first software 226, the second software 242, or a combination thereof. The first control unit 212 can execute the first software 226, the second control unit 234 can execute the second software 242, or a combination thereof to calculate the inferred terminal point 426.

Moreover, the inference module 510 can also communicate the inferred terminal point 426 between devices through the first communication unit 216, the second communication unit 236, or a combination thereof. After calculating the inferred terminal point 426, the control flow 500 can pass from the inference module 510 to the transformation module 516.

The transformation module 516 is configured to calculate one or more instances of the transformed origin point 354 of FIG. 3, the transformed terminal point 356 of FIG. 3, or a combination thereof. The transformation module 516 can calculate the transformed origin point 354 by transforming the coordinates of one or more instances of the origination point 410 from the sensor coordinate system 322 to the uniform coordinate system 324.

The transformation module 516 can calculate one or more instances of the transformed origin point 354 by applying the transformation matrix 320 to the coordinates of one or more instances of the origination point 410. More specifically, the transformation module 516 can calculate the transformed origin point 354 by multiplying the transformation matrix 320 with the coordinates of one or more instances of the origination point 410 in the sensor coordinate system 322. The resulting instance of the transformed origin point 354 can be a set of coordinates in the uniform coordinate system 324.

The transformation module 516 can also calculate one or more instances of the transformed terminal point 356 by transforming the coordinates of the known terminal point 414, the inferred terminal point 426, or a combination thereof from the sensor coordinate system 322 to the uniform coordinate system 324. The transformation module 516 can calculate the transformed terminal point 356 by applying the transformation matrix 320 to the coordinates of the known terminal point 414, the inferred terminal point 426, or a combination thereof in the sensor coordinate system 322.

More specifically, the transformation module 516 can calculate the transformed terminal point 356 by multiplying the transformation matrix 320 with the coordinates of the known terminal point 414, the inferred terminal point 426, or a combination thereof. The resulting instance of the transformed terminal point 356 can be a set of coordinates in the uniform coordinate system 324.

The transformation module 516 can be part of the first software 226, the second software 242, or a combination thereof. The first control unit 212 can execute the first software 226, the second control unit 234 can execute the second software 242, or a combination thereof to calculate one or more instances of the transformed origin point 354, the transformed terminal point 356, or a combination thereof.

Moreover, the transformation module 516 can also communicate one or more instances of the transformed origin point 354, the transformed terminal point 356, or a combination thereof between devices through the first communication unit 216, the second communication unit 236, or a combination thereof. After calculating one or more instances of the transformed origin point 354, the transformed terminal point 356, or a combination thereof, the control flow 500 can pass from the transformation module 516 to the vector projection module 518.

The vector projection module 518 is configured to determine the first position indicator 352 of FIG. 3, the second position indicator 358 of FIG. 3, or a combination thereof. The vector projection module 518 can determine the first position indicator 352, the second position indicator 358, or a combination thereof for calculating the inputs used to calculate the blended position indicator 350 of FIG. 3.

The vector projection module 518 can determine the first position indicator 352 based on an intersection of the first vector 360 of FIG. 3 and a coordinate plane representing a screen of a display interface in the uniform coordinate system 324. For example, the vector projection module 518 can determine the first position indicator 352 based on the intersection of the first vector 360 and the coordinate plane representing the screen of the first display interface 230 in the uniform coordinate system 324.

The vector projection module 518 can calculate the first vector 360 for determining the first position indicator 352. The first vector 360 can represent a possible instance of the direction of the gesture 304.

The vector projection module 518 can calculate the first vector 360 based on the transformed origin point 354 and the transformed terminal point 356 associated with the first sensor reading 306, the second sensor reading 308, or a combination thereof. The transformed origin point 354 and the transformed terminal point 356 can be coordinates in the uniform coordinate system 324.

The transformed origin point 354, the transformed terminal point 356, or a combination thereof can represent transformed instances of the appendage positions obtained from the first sensor reading 306, the second sensor reading 308, or a combination thereof. For example, the vector projection module 518 can calculate the first vector 360 based on the transformed origin point 354 representing the elbow position 312 and the transformed terminal point 356 representing the hand position 314 obtained from the first sensor reading 306.

The vector projection module 518 can calculate the first vector 360 as a vector from the transformed origin point 354 extending through the transformed terminal point 356. The vector projection module 518 can then extend the length of the first vector 360 until the first vector 360 intersects with the coordinate plane representing the screen of the display interface. The vector projection module 518 can determine the first position indicator 352 as the intersection of the first vector 360 and the coordinate plane representing the screen of the display interface in the uniform coordinate system 324.

The vector projection module 518 can determine the second position indicator 358 based on an intersection of the second vector 362 of FIG. 3 and the coordinate plane representing the screen of the display interface in the uniform coordinate system 324. For example, the vector projection module 518 can determine the second position indicator 358 based on the intersection of the second vector 362 and the coordinate plane representing the screen of the first display interface 230 in the uniform coordinate system 324.

The vector projection module 518 can calculate the second vector 362 for determining the second position indicator 358. The second vector 362 can represent another possible instance of the direction of the gesture 304. For example, the second vector 362 can represent the direction of the gesture 304 as captured by the second sensor 318. As an additional example, the second vector 362 can represent another possible direction of the gesture 304 as captured by the first sensor 310 when the user 302 is in the overlapping range profile 332.

The vector projection module 518 can calculate the second vector 362 based on additional instances of the transformed origin point 354 and the transformed terminal point 356. The vector projection module 518 can calculate the second vector 362 based on the transformed origin point 354 representing the hand position 314 and the transformed terminal point 356 representing the fingertip position 316 obtained from the second sensor reading 308. In addition, the vector projection module 518 can calculate the second vector 362 based on the transformed origin point 354 representing the hand position 314 and the transformed terminal point 356 representing the inferred terminal point 426.

The vector projection module 518 can calculate the second vector 362 by connecting a vector from the transformed origin point 354 toward the transformed terminal point 356. The vector projection module 518 can then extend the length of the second vector 362 until the second vector 362 intersects with the coordinate plane representing the screen of the display interface. The vector projection module 518 can determine the second position indicator 358 as the intersection of the second vector 362 and the coordinate plane representing the screen of the display interface in the uniform coordinate system 324.

The vector projection module 518 can be part of the first software 226, the second software 242, or a combination thereof. The first control unit 212 can execute the first software 226, the second control unit 234 can execute the second software 242, or a combination thereof to determine the first position indicator 352, the second position indicator 358, or a combination thereof.

Moreover, the vector projection module 518 can also communicate the first position indicator 352, the second position indicator 358, or a combination thereof between devices through the first communication unit 216, the second communication unit 236, or a combination thereof. After determining the first position indicator 352, the second position indicator 358, or a combination thereof, the control flow 500 can pass from the vector projection module 518 to the blending module 520.

The blending module 520 is configured to calculate the blended position indicator 350 of FIG. 3. The blending module 520 can calculate the blended position indicator 350 for estimating the direction of the gesture 304 made by the user 302.

The blending module 520 can include a weight module 522, a cursor module 524, or a combination thereof. The weight module 522 is configured to calculate the first weight 344 of FIG. 3, the second weight 346 of FIG. 3, or a combination thereof. The blending module 520 can calculate the blended position indicator 350 based on the first sensor reading 306, the second sensor reading 308, the first weight 344, the second weight 346, or a combination thereof.

The weight module 522 can calculate the first weight 344 of FIG. 3, the second weight 346 of FIG. 3, or a combination thereof. The weight module 522 can calculate the first weight 344 or the second weight 346 for increasing or decreasing the contribution of the first sensor reading 306 or the second sensor reading 308, respectively, to the calculation of the blended position indicator 350.

The weight module 522 can calculate the first weight 344 associated with the first sensor reading 306. The weight module 522 can calculate the first weight 344 based on the first sensor characteristic 336 of FIG. 3. The first sensor characteristic 336 can include the confidence score 338 of FIG. 3 and the sensor update frequency 340 of FIG. 3 associated with the first sensor 310.

The weight module 522 can calculate the second weight 346 associated with the second sensor reading 308. The weight module 522 can calculate the second weight 346 based on the second sensor characteristic 342 of FIG. 3. The second sensor characteristic 342 can include the confidence score 338 and the sensor update frequency 340 associated with the second sensor 318.

In addition, the sensor update frequency 340 can be a measure of the number of times one of the sensors 103 generates the sensor reading within a predetermined time period. For example, the sensor update frequency 340 can be a measure of the number of times the first sensor 310 generates the first sensor reading 306 within one second.

The weight module 522 can calculate the first weight 344 by identifying the confidence score 338 associated with the first sensor reading 306 and the sensor update frequency 340 associated with the first sensor 310. The weight module 522 can identify the confidence score 338 associated with the first sensor reading 306 by receiving or retrieving the confidence score 338 from the first sensor 310. For example, the weight module 522 can receive or retrieve the confidence score 338 associated with the appendage positions captured by the first sensor reading 306 such as the elbow position 312 and the hand position 314.

The confidence score 338 can include a numeric value expressed as a percentage. The confidence score 338 can also be referred to as "Confidence_n" where "n" represents a sensor number such as the first sensor 310 (n=1) or the second sensor 318 (n=2).

The weight module 522 can also calculate the first weight 344 or the second weight 346 by identifying the sensor update frequency 340 associated with the first sensor 310 or the second sensor 318, respectively. The weight module 522 can identify the sensor update frequency 340 associated with the first sensor by recording an elapsed time between the latest instance of the first sensor reading 306 and the immediately preceding instance of the first sensor reading 306.

The weight module 522 can also identify the sensor update frequency 340 associated with the second sensor 318 by recording or calculating the elapsed time between the latest instance of the second sensor reading 308 and the immediately preceding instance of the second sensor reading 308. The elapsed time can be referred to as "dt_n".

The weight module 522 can calculate the first weight 344 or the second weight 346 by incrementing or decrementing a previous instance of the first weight 344 or a previous instance of the second weight 346, respectively. The weight module 522 can increment previous instances of the first weight 344 or the second weight 346 by adding a weight enhancer to the previous instance of the first weight 344 or the second weight 346.

The weight enhancer can be a fixed numerical value predetermined by the electronic system 100, the sensors 103, or a combination thereof. The weight module 522 can increment previous instances of the first weight 344 or the second weight 346 by the weight enhancer when the electronic system 100 identifies a new sensor reading from the first sensor 310 or the second sensor 318, respectively. The weight module 522 can also multiply the confidence score 338 by the weight enhancer.

More specifically, the weight module 522 can increment the previous instance of the first weight 344 by the weight enhancer when the gesture tracking module 508 identifies a new instance of the first sensor reading 306 from the first sensor 310. In addition, the weight module 522 can increment the previous instance of the second weight 346 by the weight enhancer when the gesture tracking module 508 identifies a new instance of the second sensor reading 308 from the second sensor 318.

The first weight 344 or the second weight 346 can be referred to as "Weight_n", the previous instance of the first weight 344 or the second weight 346 can be referred to as "PreviousWeight_n", and the weight enhancer can be referred to as "dW". The weight module 522 can calculate the first weight 344 or the second weight 346 by incrementing previous instances of the first weight 344 or the second weight 346, respectively, according to Equation 4 below.

$$\text{Weight}\_n = \text{PreviousWeight}\_n + (dW * \text{Confidence}\_n) \quad \text{(Equation 4)}$$

The weight module 522 can also calculate the first weight 344, the second weight 346, or a combination thereof by decrementing weights associated with all other sensors not providing a sensor reading. For example, the electronic system 100 can receive only the first sensor reading 306 from the first sensor 310 at a particular moment in time. In this example, the electronic system 100 can increment the first weight 344 of the first sensor 310 while decrementing the second weight 346 of the second sensor 318.

The weight module 522 can decrement the first weight 344 or the second weight 346 by decrementing previous instances of the first weight 344 or the second weight 346, respectively. The weight module 522 can decrement previous instances of the first weight 344 or the second weight 346, respectively, based on the sensor update frequency 340. The weight module 522 can decrement previous instances of the first weight 344 or the second weight 346 by multiplying previous instances of the first weight 344 or the second weight 346, respectively, by an exponential of a rate of decay multiplied by the sensor update frequency 340.

The rate of decay can be referred to as "Rate". The weight module 522 can calculate the first weight 344 or the second weight 346 by decrementing previous instances of the first weight 344 or the second weight 346, respectively, according to Equation 5 below.

$$\text{Weight}\_n = \text{PreviousWeight}\_n * \exp(\text{Rate} * dt) \quad \text{(Equation 5)}$$

The weight module 522 can increment the first weight 344, the second weight 346, or a combination thereof according to Equation 4 while also decrementing all other sensors not providing a sensor update according to Equation 5. The weight module 522 can also establish a minimum cutoff threshold for weights associated with the sensors 103.

The weight module 522 can establish a minimum cutoff threshold associated with the first weight 344, the second weight 346, or a combination thereof. The minimum cutoff threshold can be a numerical value below which a sensor can be considered inactive for purposes of providing sensor updates. The weight module 522 can ignore sensors where the weights associated with the sensors 103 fall below the minimum cutoff threshold.

The weight module 522 can further calculate the first weight 344, the second weight 346, or a combination thereof based on environmental factors such as room lighting measurements or time of day, an orientation or body position of the user 302, or a combination thereof.

The weight module 522 can further calculate the first weight 344, the second weight 346, or a combination thereof based on a user characteristic, such as age, size, preference, gender, or a combination thereof of the user 302. The weight module 522 can further calculate the first weight 344, the second weight 346, or a combination thereof based on the user location 326 relative to one or more of the sensors 103, such as a presence of the user 302 in the first range profile 328 or the second range profile 330.

The weight module 522 can further calculate the first weight 344, the second weight 346, or a combination thereof using the various factors described above as inputs. The weight module 522 can include a method, a process, an equation, or a combination thereof utilizing one or more of the inputs described above to calculate the first weight 344, the second weight 346, or a combination thereof. For example, the weight module 522 can include one or more equations similar to Equations (4)-(5) utilizing one or more of the other inputs described above.

The weight module 522 can store the first weight 344, the second weight 346, or a combination thereof in the first storage unit 214, the second storage unit 246, or a combination thereof. The weight module 522 can update the first weight 344, the second weight 346, or a combination thereof after the electronic system 100 receives a sensor reading from one of the sensors 103.

For illustrative purposes, the electronic system 100 is described with the first sensor 310 and the second sensor 318, although it is understood that the electronic system 100 can include three or more of the sensors 103. In the instance where the electronic system 100 includes three or more of the sensors 103, weights can be calculated for all non-reporting sensors as soon as a sensor reading is received for one of the sensors 103.

The blending module 520 can calculate the blended position indicator 350. The blending module 520 can calculate the blended position indicator 350 based on the first position indicator 352, the first weight 344, the second position indicator 358, the second weight 346, the user location 326, or a combination thereof. The blending module 520 can calculate the blended position indicator 350 for combining multiple instances of the gesture 304 captured by the first sensor 310, the second sensor 318, or a combination thereof in order to estimate the direction of the gesture 304.

For example, the blending module 520 can calculate the blended position indicator 350 for combining the gesture 304 captured by the first sensor 310 and the gesture 304 captured by the second sensor 318. As an additional example, the blending module 520 can calculate one instance of the gesture 304, such as the elbow position 312 and the hand position 314, captured by one of the sensors 103 and another instance of the gesture 304, such as the hand position 314 and the fingertip position 316, captured by the same instance of the sensors 103.

The blending module 520 can calculate the blended position indicator 350 by calculating a weighted sum of the first position indicator 352 and the second position indicator 358. The blending module 520 can calculate the weighted average or mean of the first position indicator 352 and the second position indicator 358 by first applying the first weight 344 to the first position indicator 352 and applying the second weight 346 to the second position indicator 358. The blending module 520 can then calculate the blended position indicator 350 by summing the resulting products.

For example, the blending module 520 can apply the first weight 344 to the first position indicator 352 by multiplying the first weight 344 with the coordinates of the first position indicator 352 in the uniform coordinate system 324. Also, for example, the blending module 520 can apply the second weight 346 to the second position indicator 358 by multiplying the second weight 346 with the coordinates of the second position indicator 358. The blending module 520 can calculate the blended position indicator 350 by summing the product of the first weight 344 and the first position indicator 352 and the product of the second weight 346 and the second position indicator 358.

The blending module 520 can also calculate the blended position indicator 350 by calculating a weighted harmonic mean, a weighted arithmetic mean, or a combination thereof using the first position indicator 352, the second position indicator 358, the first weight 344, and the second weight 346.

The blending module 520 can calculate the blended position indicator 350 based on the user location 326 in the overlapping range profile 332. When the overlapping range profile 332 refers to a region of intersection between the first range profile 328 associated with the first sensor 310 and the second range profile 330 associated with the second sensor 318, the blending module 520 can calculate the blended position indicator 350 based on the first position indicator 352 calculated from the first sensor reading 306 and the second position indicator 358 calculated from appendage positions captured by the second sensor reading 308.

When the overlapping range profile 332 refers to an overlap region between the first range profile 328 and the second range profile 330 associated with one of the first sensor 310 or the second sensor 318, the blending module 520 can calculate the blended position indicator 350 based on the first position indicator 352 calculated from one set of appendage positions, such as the elbow position 312 and the hand position 314, and the second position indicator 358 calculated from another set of appendage positions, such as the hand position 314 and the fingertip position 316.

The cursor module 524 is configured to generate the cursor 348 of FIG. 3 at the blended position indicator 350. The cursor module 524 can generate the cursor 348 at the blended position indicator 350 for communicating the blended position indicator 350 to the user 302 of the electronic system 100. More specifically, the cursor module 524 can generate the cursor 348 at the blended position indicator 350 for the user 302 to control or manipulate a graphic or user interface depicted on a display interface such as the first display interface 230, the second display interface 240, or a combination thereof.

The cursor module 524 can generate the cursor 348 as a graphic icon on the first display interface 230, the second display interface 240, or a combination thereof. The cursor module 524 can generate the graphic icon representing the cursor 348 at a display coordinate corresponding to the blended position indicator 350. The cursor module 524 can generate the cursor 348 on the first display interface 230 when the user 302 undertakes the gesture 304 at the first display interface 230.

The blending module 520 can be part of the first software 226, the second software 242, or a combination thereof. The first control unit 212 can execute the first software 226, the second control unit 234 can execute the second software 242, or a combination thereof to calculate the blended position indicator 350 and generate the cursor 348 at the blended position indicator 350. Moreover, the blending module 520 can also communicate the blended position indicator 350 and the cursor 348 between devices through the first communication unit 216, the second communication unit 236, or a combination thereof.

The physical transformation of displaying the cursor 348 at the blended position indicator 350 results in movement in the physical world, such as people using the electronic system 100 to control display interfaces remotely. As the movement in the physical world occurs, the movement itself generates additional instances of the cursor 348 and to continued movement in the physical world.

It has been discovered that calculating the blended position indicator 350 based on the first sensor reading 306, the second sensor reading 308, or a combination thereof provides a more accurate mechanism for controlling a display interface such as the first display interface 230, the second display interface 240, or a combination thereof. More specifically, the electronic system 100 can use the blended position indicator 350 to approximate the direction of the gesture 304 made by the user 302. The electronic system 100 can more accurately approximate the direction of the gesture 304 based on readings from multiple instances of the sensors 103 rather than relying on readings from only one of the sensors 103.

It has further been discovered that calculating the blended position indicator 350 based on the first sensor reading 306, the second sensor reading 308, or a combination thereof enhances the usability of different sensors provided by different sensor vendors or manufacturers. For example, the electronic system can blend or combine readings from the first sensor 310 and the second sensor 318 for ensuring a user gesture, such as the gesture 304, is captured by the second sensor 318 when the user gesture is outside of the first range profile 328 of the first sensor 310.

It has been discovered that calculating the blended position indicator 350 based on the first origin point 412, the known terminal point 414, the second origin point 424, and the inferred terminal point 426 provide an improved mechanism for controlling a display interface when the user 302 is gesturing in a rapid or unpredictable manner. In this instance, the electronic system 100 can calculate the inferred terminal point 426, representing an obscured or hard to detect appendage position, based on known appendage positions, the first appendage orientation 406, and the second appendage orientation 416. The electronic system 100 can calculate the blended position indicator 350 based on the inferred terminal point 426 to prevent the cursor 348 from skipping or disappearing when an appendage position of the user 302 is not captured by any of the sensors 103.

It has been discovered that calculating the blended position indicator 350 by applying the first weight 344 to the first position indicator 352 and applying the second weight 346 to the second position indicator 358 provides for a more accurate mechanism for controlling a display interface by taking into account the confidence score 338 and the sensor update frequency 340 of the sensors 103. By applying more weight to the sensors 103 which provide more frequent and more confident sensor readings, the electronic system 100 can ensure the blended position indicator 350 reflects the contribution of the sensors 103 capturing the gesture 304 with the most confidence and most often.

The modules describes in this application can be ordered or partitioned differently. For example, certain modules can be combined. Each of the modules can also operate individually and independently of the other modules. Furthermore, data generated in one module can be used by another module without being directly coupled to each other.

The modules described in this application can be implemented by hardware circuitry or hardware acceleration units (not shown) in the control units. The modules described in this application can also be implemented by separate hardware units (not shown), including hardware circuitry, outside the control units but with the first device 102 or the second device 106.

For illustrative purposes, the various modules have been described as being specific to the first device 102, the second device 106, or a combination thereof. However, it is understood that the modules can be distributed differently. For example, the various modules can be implemented in a different device, or the functionalities of the modules can be distributed across multiple devices.

The modules described in this application can be implemented as instructions stored on a non-transitory computer readable medium to be executed by a first control unit 412, the second control unit 434, or a combination thereof. The non-transitory computer medium can include the first storage unit 414, the second storage unit 446, or a combination thereof. The first storage unit 414, the second storage unit 446, or a combination thereof, or a portion therein can also be made removable from the first device 102, the second device 106, or a combination thereof.

The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the navigation system 100 or installed as a removable portion of the navigation system 100.

As a more specific example, one or more modules described above can be stored in the non-transitory memory medium for distribution to a different system, a different device, a different user, or a combination thereof. Also as a more specific example, the modules described above can be implemented or stored using a single hardware unit, such as a chip or a processor, or across multiple hardware units.

Figure 6:
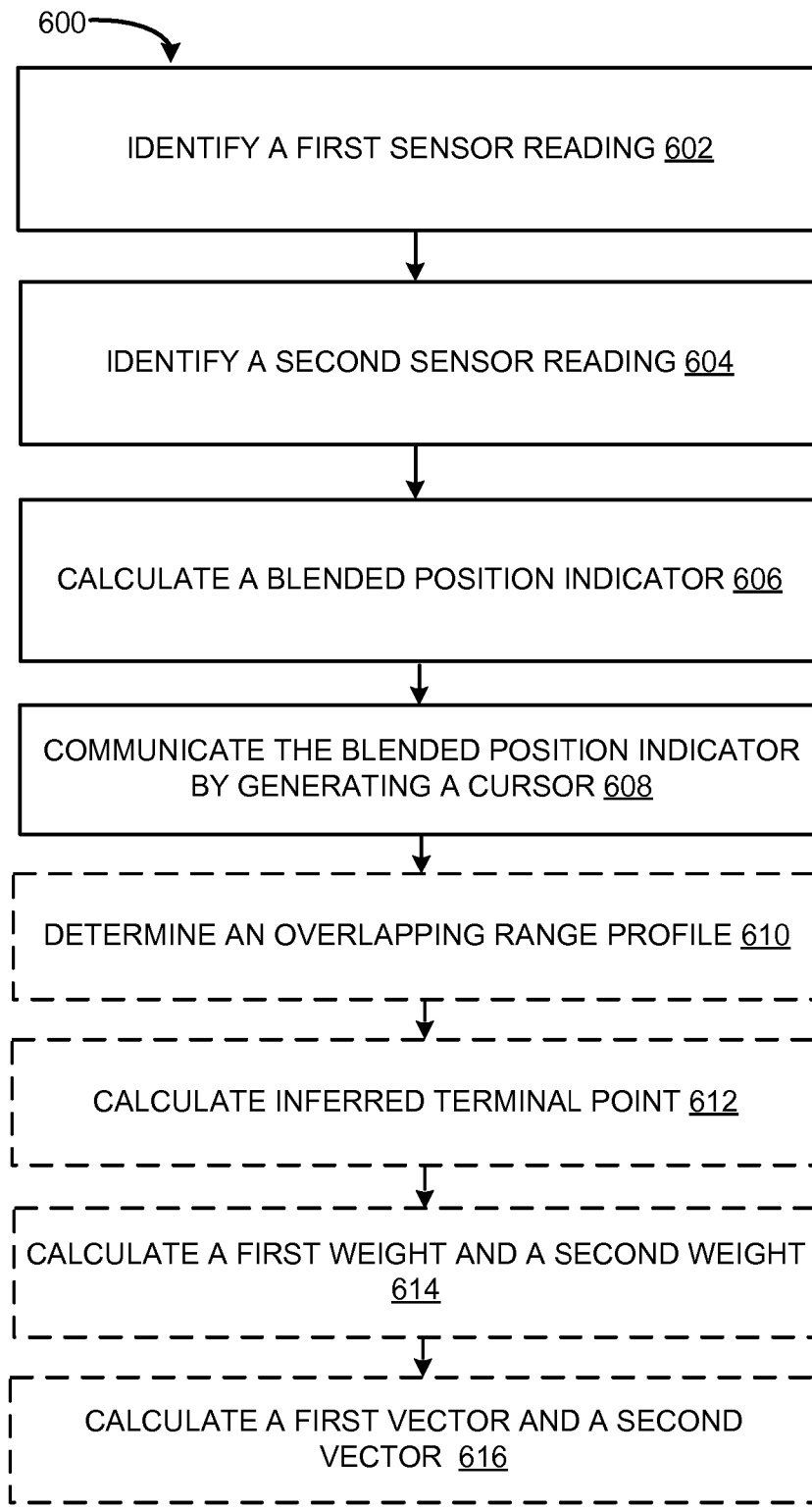
FIG. 6 is a flow chart of a method of operation of the electronic system in a further embodiment of the present invention.

Referring now to FIG. 6, therein is shown an exemplary flow chart of a method 600 of operation of the electronic system 100 of FIG. 1 in a further embodiment. In one example embodiment, the electronic system 100 can implement the control flow 500 of FIG. 5.

The method 600 can include identifying, with the control unit 212 of FIG. 2, the first sensor reading 306 of FIG. 3 for capturing the gesture 304 of FIG. 3 directed at the first display interface 230 of FIG. 2 using the first range profile 328 of FIG. 3 in a block 602. The method 600 can also include identifying the second sensor reading 308 of FIG. 3 for capturing the gesture 304 directed at the first display interface 230 using the second range profile 330 of FIG. 3 in a block 604.

The method 600 can further include calculating the blended position indicator 350 of FIG. 3 based on the first sensor reading 306, the second sensor reading 308, or a combination thereof in a block 606. The method 600 can also include communicating, with the communication interface 228 of FIG. 2 coupled to the control unit 212, the blended position indicator 350 by generating the cursor 348 of FIG. 3 at the blended position indicator 350 in a block 608.

The method 600 can further include determining the overlapping range profile 332 of FIG. 3 involving the first range profile 328 and the second range profile 330 in a block 610. The block 610 can also include identifying the first sensor reading 306 for capturing the gesture 304 made within the overlapping range profile 332; identifying the second sensor reading 308 for capturing the gesture 304 made within the overlapping range profile 332; and calculating the blended position indicator 350 based on the overlapping range profile 332, the first sensor reading 306, and the second sensor reading 308.

The method 600 can further include calculating the inferred terminal point 426 of FIG. 4 based on the first origin point 412 of FIG. 4, the known terminal point 414 of FIG. 4, and the second origin point 424 of FIG. 4 in a block 612. The block 612 can also include determining the first origin point 412 and the known terminal point 414 based on the first sensor frame 402 of FIG. 4 and determining the second origin point 424 of FIG. 4 based on the second sensor frame 404 of FIG. 4. The block 612 can further include calculating the blended position indicator 350 based on the first origin point 412, the known terminal point 414, the second origin point 424, and the inferred terminal point 426.

The method 600 can further include calculating the first weight 344 of FIG. 3 associated with the first sensor reading 306 based on the first sensor characteristic 336 of FIG. 3 and calculating the second weight 346 of FIG. 3 associated with the second sensor reading 308 based on the second sensor characteristic 342 of FIG. 3 in a block 614. The block 614 can include calculating the blended position indicator 350 by applying the first weight 344 to a first position indicator 352 and applying the second weight 346 to a second position indicator 358.

The method 600 can further include calculating the first vector 360 of FIG. 3 for representing the gesture 304 directed at the display interface 230 and calculating the second vector 362 of FIG. 3 for representing the gesture 304 directed at the display interface 230 in a block 616. The block 616 can also include calculating the blended position indicator 350 based on the first vector 360 and the second vector 362.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the embodiment of the present invention is that it valuably supports and services the historical trend of reducing costs, simplifying systems, and increasing performance. These and other valuable aspects of the embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. An electronic system comprising:
   a control unit configured to:
     identify a first sensor reading for capturing a gesture directed at a display interface using a first range profile corresponding to a granularity or sensitivity, a physical location or orientation, or a combination thereof for the first sensor reading;
     calculate a first weight associated with the first sensor reading based on a first sensor characteristic;
     identify a second sensor reading for capturing the gesture directed at the display interface using a second range profile corresponding to a further granularity or sensitivity, a further physical location or orientation, or a combination thereof for the second sensor reading;
     calculate a second weight associated with the second sensor reading based on a second sensor characteristic;
     calculate a blended position indicator based on the first sensor reading, the second sensor reading, or a combination thereof according to the first range profile and the second range profile; by applying the first weight to a first position indicator and applying the second weight to a second position indicator; and
   a communication interface, coupled to the control unit, configured to communicate the blended position indicator by generating a cursor at the blended position indicator.

2. The system as claimed in claim 1 wherein the control unit is further configured to:
   determine an overlapping range profile involving the first range profile and the second range profile;
   identify the first sensor reading for capturing the gesture made within the overlapping range profile;
   identify the second sensor reading for capturing the gesture made within the overlapping range profile; and
   calculate the blended position indicator based on the overlapping range profile, the first sensor reading, and the second sensor reading.

3. The system as claimed in claim 1 wherein the control unit is further configured to:
   determine a first origin point and a known terminal point based on a first sensor frame;
   determine a second origin point based on a second sensor frame;
   calculate an inferred terminal point based on the first origin point, the known terminal point, and the second origin point; and
   calculate the blended position indicator based on the first origin point, the known terminal point, the second origin point, and the inferred terminal point.

4. The system as claimed in claim 1 wherein the control unit is further configured to:
   calculate the first weight by identifying a confidence score associated with the first sensor reading;
   calculate the second weight by identifying the confidence score associated with the second sensor reading; and
   calculate the blended position indicator by applying the first weight to the first position indicator and applying the second weight to the second position indicator.

5. The system as claimed in claim 1 wherein the control unit is further configured to:
   calculate a first vector for representing the gesture directed at the display interface;
   calculate a second vector for representing the gesture directed at the display interface; and
   calculate the blended position indicator based on the first vector and the second vector.

6. The system as claimed in claim 1 wherein the control unit is further configured to:
   calculate the first weight by identifying a confidence score associated with the first sensor reading and a sensor update frequency associated with a first sensor;
   calculate the second weight by identifying a confidence score associated with the second sensor reading and a sensor update frequency associated with a second sensor; and
   calculate the blended position indicator by applying the first weight to the first position indicator and applying the second weight to the second position indicator.

7. The system as claimed in claim 1 wherein the control unit is further configured to calculate the blended position indicator based on a user location determined to be within the first range profile, an overlapping range profile, or the second range profile.

8. The system as claimed in claim 1 wherein the control unit is further configured to:
   identify the first sensor reading for capturing the gesture by a first sensor;
   identify the second sensor reading for capturing the gesture by a second sensor different from the first sensor; and
   calculate the blended position indicator for combining the gesture captured by the first sensor and the gesture captured by the second sensor.

9. The system as claimed in claim 1 wherein the control unit is further configured to:
   determine an overlapping range profile involving the first range profile and the second range profile;
   calculate a first vector based on an elbow position and a hand position for representing the gesture made in the overlapping range profile;
   calculate a second vector based on the hand position and a fingertip position for representing the gesture made in the overlapping range profile; and
   calculate the blended position indicator based on the overlapping range profile, the first vector, and the second vector.

10. The system as claimed in claim 1 wherein the control unit is further configured to:
    determine a first appendage orientation based on a first sensor frame;
    determine a second appendage orientation based on a second sensor frame; and
    calculate the blended position indicator based on a first origin point, a known terminal point, a second origin point, the first appendage orientation, and the second appendage orientation.

11. A method of operation of an electronic system comprising:

identifying a first sensor reading for capturing a gesture directed at a display interface using a first range profile corresponding to a granularity or sensitivity, a physical location or orientation, or a combination thereof for the first sensor reading;
calculating a first weight associated with the first sensor reading based on a first sensor characteristic;
identifying a second sensor reading for capturing the gesture directed at the display interface using a second range profile corresponding to a further granularity or sensitivity, a further physical location or orientation, or a combination thereof for the second sensor reading;
calculating a second weight associated with the second sensor reading based on a second sensor characteristic;
calculating with a control unit a blended position indicator based on the first sensor reading, the second sensor reading, or a combination thereof according to the first range profile and the second range profile, by applying the first weight to a first position indicator and applying the second weight to a second position indicator; and
communicating, with a communication interface coupled to the control unit, the blended position indicator by generating a cursor at the blended position indicator.

12. The method as claimed in claim 11 further comprising:
determining an overlapping range profile involving the first range profile and the second range profile;
identifying the first sensor reading for capturing the gesture made within the overlapping range profile;
identifying the second sensor reading for capturing the gesture made within the overlapping range profile; and
calculating the blended position indicator based on the overlapping range profile, the first sensor reading, and the second sensor reading.

13. The method as claimed in claim 11 further comprising:
determining a first origin point and a known terminal point based on a first sensor frame;
determining a second origin point based on a second sensor frame;
calculating an inferred terminal point based on the first origin point, the known terminal point, and the second origin point; and
calculating the blended position indicator based on the first origin point, the known terminal point, the second origin point, and the inferred terminal point.

14. The method as claimed in claim 11 wherein:
calculating the first weight includes identifying a confidence score associated with the first sensor reading;
calculating the second weight includes identifying the confidence score associated with the second sensor reading; and
calculating the blended position indicator by applying the first weight to a first position indicator and applying the second weight to a second position indicator.

15. The method as claimed in claim 11 further comprising:
calculating a first vector for representing the gesture directed at the display interface;
calculating a second vector for representing the gesture directed at the display interface; and
calculating the blended position indicator based on the first vector and the second vector.

16. A non-transitory computer readable medium including instructions for execution, comprising:
identifying a first sensor reading for capturing a gesture directed at a display interface using a first range profile corresponding to a granularity or sensitivity, a physical location or orientation, or a combination thereof for the first sensor reading;
calculating a first weight associated with the first sensor reading based on a first sensor characteristic;
identifying a second sensor reading for capturing the gesture directed at the display interface using a second range profile corresponding to a further granularity or sensitivity, a further physical location or orientation, or a combination thereof for the second sensor reading;
calculating a second weight associated with the second sensor reading based on a second sensor characteristic;
calculating a blended position indicator based on the first sensor reading, the second sensor reading, or a combination thereof according to the first range profile and the second range profile, by applying the first weight to a first position indicator and applying the second weight to a second position indicator; and
communicating the blended position indicator by generating a cursor at the blended position indicator.

17. The non-transitory computer readable medium as claimed in claim 16 further comprising:
determining an overlapping range profile involving the first range profile and the second range profile;
identifying the first sensor reading for capturing the gesture made within the overlapping range profile;
identifying the second sensor reading for capturing the gesture made within the overlapping range profile; and
calculating the blended position indicator based on the overlapping range profile, the first sensor reading, and the second sensor reading.

18. The non-transitory computer readable medium as claimed in claim 16 further comprising:
determining a first origin point and a known terminal point based on a first sensor frame;
determining a second origin point based on a second sensor frame;
calculating an inferred terminal point based on the first origin point, the known terminal point, and the second origin point; and
calculating the blended position indicator based on the first origin point, the known terminal point, the second origin point, and the inferred terminal point.

19. The non-transitory computer readable medium as claimed in claim 16 wherein
calculating the first weight includes identifying a confidence score associated with the first sensor reading;
calculating the second weight includes identifying the confidence score associated with the second sensor reading; and
calculating the blended position indicator by applying the first weight to a first position indicator and applying the second weight to a second position indicator.

20. The non-transitory computer readable medium as claimed in claim 16 further comprising:
calculating a first vector for representing the gesture directed at the display interface;
calculating a second vector for representing the gesture directed at the display interface; and
calculating the blended position indicator based on the first vector and the second vector.

* * * * *